US008868497B2

(12) United States Patent
Yan et al.

(10) Patent No.: US 8,868,497 B2
(45) Date of Patent: Oct. 21, 2014

(54) CORRELATION AWARE SYNCHRONIZATION FOR NEAR REAL-TIME DECISION SUPPORT

(75) Inventors: Ying Yan, Shanghai (CN); Wen-Syan Li, Shanghai (CN); Jian Xu, Jiangsu Province (CN)

(73) Assignee: SAP AG, Walldorf (DE)

( * ) Notice: Subject to any disclaimer, the term of this patent is extended or adjusted under 35 U.S.C. 154(b) by 229 days.

(21) Appl. No.: 12/767,524

(22) Filed: Apr. 26, 2010

(65) Prior Publication Data
US 2010/0318495 A1 Dec. 16, 2010

Related U.S. Application Data

(63) Continuation-in-part of application No. 12/758,608, filed on Apr. 10, 2010.

(60) Provisional application No. 61/220,554, filed on Jun. 25, 2009.

(51) Int. Cl.
G06F 7/00 (2006.01)
G06F 17/00 (2006.01)

(52) U.S. Cl.
USPC ......................................................... 707/618

(58) Field of Classification Search
USPC ................. 707/610–620, 624, 626, 633–641, 707/655–660, 706–709, 713, 718, 719–722, 707/759–779, 799, 999.001–999.01, 999.1, 707/999.101, 999.107, 999.2–999.206
See application file for complete search history.

(56) References Cited

U.S. PATENT DOCUMENTS

| 5,579,318 | A * | 11/1996 | Reuss et al. ................... 370/410 |
| 7,315,872 | B2 | 1/2008 | Narang et al. |
| 7,333,982 | B2 * | 2/2008 | Bakalash et al. .............. 707/600 |
| 7,383,247 | B2 | 6/2008 | Li et al. |
| 2006/0047721 | A1 * | 3/2006 | Narang et al. ................ 707/204 |
| 2007/0174292 | A1 | 7/2007 | Li et al. |
| 2010/0318559 | A1 | 12/2010 | Yan et al. |

OTHER PUBLICATIONS

Non-Final Office Action for U.S. Appl. No. 12/758,608, mailed Jan. 19, 2012, 15 pages.
Wen-Syan, et al, "On Demand Synchronization and Load Distribution for Database Grid-based Web Applications", Data & Knowledge Engineering, vol. 51, 2004, pp. 295-323.
Yan, et al, "Correlation Aware Synchronization for Near Real Time Decision Support Systems", ACM's EDBT 2010, Mar. 22-26, 2010, 12 pages.

(Continued)

Primary Examiner — Hosain Alam
Assistant Examiner — Reza Hosseini
(74) Attorney, Agent, or Firm — Brake Hughes Bellermann LLP

(57) ABSTRACT

A query handler may be configured to receive a query which is applicable against different combinations of a plurality of remote databases and a corresponding plurality of replica databases including at least some replicated data of respective ones of the remote databases, wherein the query arrives at a plurality of query arrival times and is executed at a plurality of query execution times. A replication manager may be configured to execute a synchronization plan for at least one selected replica database in which a selected synchronization timestamp of the at least one selected replica database is updated to a target synchronization timestamp, wherein the synchronization occurs during a synchronization processing time. A synchronization scheduler may be configured to schedule the synchronization plan to increase an information value of a query response, including selecting the target synchronization timestamp including relating the synchronization processing time to a selected query execution time.

23 Claims, 20 Drawing Sheets

(56) References Cited

OTHER PUBLICATIONS

Yan, et al, "Information Value-driven Near Real-time Decision Support Systems", 29th IEEE Int'l Conference on Distributed Computing Systems, Jun. 22-26, 2009, pp. 571-578.

Bernstein, et al., "Relaxed-currency serializability for middle-tier caching and replication." in Proc. of the ACM SIGMOD Int'l Conference on Management of Data, Chicago, Illinois, USA, 2006, pp. 599-610.

Graham, "Bounds for certain multiprocessing anomalies," Bell Systems Technical Journal, No. 45, pp. 1563-1581, 1966.

Land, et al., "An Automatic Method of Solving Discrete Programming Problems," Econometrica, vol. 28, No. 3, pp. 497-520, Jul. 1960.

Goffe, et al., "Global optimization of statistical functions with simulated annealing," J. Econometrica, No. 60, 1994, 40 pages.

Guo, et al., "Relaxed Currency and Consistency: How to Say "Good Enough" in SQL" in Proc. of the ACM SIGMOD Int'l Conference on Management of Data, Jun. 2004, 12 pages.

Lima, et al, "Dynamic Optimization of Batch Emulsion Polymerization Using MSIMPSA, a Simulated-Annealing-Based Algorithm", Industrial & Engineering Chemistry Research, 2004, 43 (24), pp. 7796-7806.

Costa, et al., "Evolutionary algorithms approach to the solution of mixed integer nonlinear programming problems," in Computers & Chemical Engineering, vol. 25, Issues 2-3, Mar. 15, 2001, pp. 257-266.

Oliveira, et al., "Benchmark testing of simulated annealing, adaptive random search and genetic algorithms for the global optimization of bioprocesses," in International Conference on Adaptive and Natural Computing Algorithms, 2005, p. 292.

Jiang, et al., "Exploiting Correlation and Parallelism for Materialized-View Recommendation in Distributed Data Warehouses," in ICDE, 2007, 10 pages.

Larson, et al., "MTCache: Transparent Mid-Tier Database Caching in SQL Server," in ICDE, 2004, 6 pages.

"TPC Benchmark H", Transaction Processing Performance Council, Standard Specification, Revision 2.8.0, http://www.tpc.org/hspec.html, 149 pages.

Venugopal, et al., "A Taxonomy of Data Grids for Distributed Data Sharing, Management and Processing," ACM Comput. Surv., vol. 38, No. 1, 2006, 60 pages.

Li, et al., "On demand synchronization and load distribution for database grid-based Web applications," Data and Knowledge Engineering, vol. 51, No. 3, 2004, pp. 295-323.

Phan, et al., "Evolving Toward the Perfect Schedule: Co-scheduling Job Assignments and Data Replication in Wide-Area Systems Using a Genetic Algorithm," in JSSPP, 2005, pp. 173-193.

Acharya, et al., "Balancing Push and Pull for Data Broadcast," in Proceedings of the ACM SIGMOD International Conference, May 1997, 16 pages.

Deolasee, et al., "Adaptive Push-Pull: Dissemination of Dynamic Web Data," in the Proceedings of the 10th WWW Conference, May 2001, 23 pages.

Olston, et al., "Adaptive Precision Setting for Cached Approximate Values," in Proceedings of the ACM SIGMOD International Conference on Management of Data, 2001, pp. 355-366.

Olston, et al., "Best-Effort Cache Synchronization with Source Cooperation," in Proceedings of the ACM SIGMOD International Conference on Management of Data, 2002, pp. 73-84.

Golab, et al., "Scheduling Updates in a Real-Time Stream Warehouse ," in ICDE, Mar. 2009, pp. 1207-1210.

Leontyev, et al., "Predicting Maximum Data Staleness in Real-TimeWarehouses," in Proceedings of the 30th IEEE Real-Time Systems Symposium, 2007, 10 pages.

Naumann, et al., "Quality-driven Integration of Heterogeneous Information Systems," in VLDB, 1999, pp. 447-458.

Naumann, "Quality-Driven Query Answering for Integrated Information Systems", Lecture Notes in Computer Science, 2002, vol. 2261, 10 pages.

Li, et al., "Load Balancing for Multi-tiered Database Systems through Autonomic Placement of Materialized Views," in Proceedings of the International Conference on Data Engineering, 2006, 12 pages.

Golab, et al., "Multi-Query Optimization of Sliding Window Aggregates by Schedule Synchronization", University of Waterloo, Technical Report CS-2006-26, Aug. 2006, 22 pages.

Altinel, et al, "Cache Tables: Paving the Way for an Adaptive Database Cache", Proceedings of the 2003 VLDB Conference, Sep. 2003, 12 pages.

Amiri, et al, "DbProxy: A dynamic data cache for web application", Proceedings of the 19th Int'l Conference on Data Engineering, Mar. 2003, pp. 821-831.

Guo, et al, "Relaxed Currency and Consistency: How to Say "Good Enough" in SQL", Proceedings of the ACM SIGMOD Int'l Conference on Management of Data, Jun. 2004, pp. 815-826.

"JavaSim User's Guide", University of Newcastle Upon Tyne, Public Release 0.3, Version 1.0, 1999, 43 pages.

"TPC Benchmark H Specification", Transaction Processing Performance Council (TPC), Standard Specification, Revision 2.8.0, Sep. 2008, 149 pages.

Larson, et al, "MTCache: Transparent Mid-Tier Database Caching for SQL Server", Proceedings of the International Conference on Data Engineering, 2004, 6 pages.

Li, et al. "Load and Network Aware Query Routing for Information Integration", Proceedings of the International Conference on Data Engineering, 2005, 12 pages.

Naumann, "Quality-Driven Query Answering for Integrated Information Systems", LNCS, vol. 2261, 2002, 10 pages.

Naumann, et al, "Quality-Driven Integration of Heterogeneous Information Systems", VIDB'99, Proceedings of 25th International Conference on Very Large Data Bases, Sep. 7-10, 1999, pp. 447-458.

Roy, et al, "Efficient and Extensible Algorithms for Multi Query Optimization", Proceedings of the ACM SIGMOD International Conference on Management of Data, 2002, 12 pages.

Phan, et al, "Load distribution of Analytical query workloads for database cluster Architectures", Proceedings of the International Conference on Extended Database Technology, Mar. 2008, 12 pages.

Phan, et al, "A Request-Routing Framework for SOA-based Enterprise Computing", Proceedings of the International Conference on Very Large Data Bases, Aug. 2008, 12 pages.

Bernstein, et al, "Relaxed-currency serializability for middle-tier caching and replication", Proceedings of the ACM SIGMOD Int'l Conference on Management of Data, Jun. 2006, 18 pages.

Jiang, et al, "Exploiting Correlation and Parallelism of Materialized-View Recommendation for Distributed Data Warehouses", Proceedings of the 23rd International Conference on Data Engineering, Apr. 2007, pp. 276-285.

The Times Ten Team, "Mid-Tier Caching: The Times Ten Approach", Proceedings of the ACM SIGMOD Int'l Conference on Management of Data, Jun. 2002, pp. 588-593.

Phan, et al, "Dynamic Materialization of Query Views for Data Warehouse Workloads", Proceedings of the International Conference on Data Engineering, Apr. 2008, pp. 436-445.

Li et al, "Load Balancing for Multi-tiered Database Systems through Autonomic Placement of Materialized Views", Proceedings of the International Conference on Data Engineering, 2006, 12 pages.

Notice of Allowance for U.S. Appl. No. 12/758,608, mailed Jun. 25, 2012, 21 pages.

Haifeng Jiang et al., "Exploiting Correlation and Parallelism of Materialized-View Recommendation for Distributed Data Warehouses", IEEE (2007), pp. 276-285.

Bernstein et al., "Relaxed Currency Serializability for Middle-Tier Caching and Replication", ACM SIGMOD (2006), pp. 599-610.

Wen-Syan Li et al., "Load Balancing for Multi-tiered Database Systems through Autonomic Placement of Materialized Views", IEEE 22nd International Conference on Data Engineering (2006), 12 pages.

Wen-Syan Li et al., "Load and Network Aware Query Routing for Information Integration", IEEE 21st International Conference on Data Engineering (2005), 12 pages.

* cited by examiner

CORRELATION AWARE SYNCHRONIZATION FOR NEAR REAL-TIME DECISION SUPPORT

CROSS REFERENCE TO RELATED APPLICATIONS

This application claims priority under 35 U.S.C. §119 to Chinese Patent Application No. 200910163949.2, filed on Jun. 12, 2009, titled "INFORMATION VALUE-DRIVEN NEAR REAL-TIME DECISION SUPPORT," and to U.S. Provisional Application No. 61/220,554, filed Jun. 25, 2009, titled "INFORMATION VALUE-DRIVEN NEAR REAL-TIME DECISION SUPPORT," which are incorporated herein by reference in their entireties. This application claims priority under 35 U.S.C. §120 to, and is a continuation-in-part of, U.S. patent application Ser. No. 12/758,608, filed on Apr. 12, 2010, titled "INFORMATION VALUE-DRIVEN NEAR REAL-TIME DECISION SUPPORT," which is also incorporated herein by reference in its entirety.

TECHNICAL FIELD

This description relates to decision support systems.

BACKGROUND

Human and automated decisions are presumably made using information which may be relevant to the decisions, and/or to the outcomes of the decisions. Decision support thus generally refers to the field of obtaining and providing such information in a manner best-suited to assist in the decision-making. Many different fields and settings may benefit from such decision support, including, to name a few examples, the realms of business, legal, educational, governmental, health, military, and personal. In a business setting, for example, an equities manager may wish to make a decision about whether to purchase a particular equity, and may wish to have access to information which may assist in making such a decision.

In an ideal situation, decision makers may easily be presented with exactly the information needed to make the decision(s), e.g., all available information may be up-to-date, and may be parsed such that only desired/necessary information is extracted to be provided to the decision maker. In reality, it is difficult or impossible to reach such an ideal solution. For example, the necessary information may be large in amount, and/or may be distributed across a large geographical area (e.g., in multiple datacenters), perhaps stored in heterogeneous systems. Meanwhile, some information is time critical for some decisions, and therefore rapidly becomes out of date and useless for decision support. On the other hand, other information may remain current almost indefinitely for purposes of making the same or different decision(s). Considering these and other factors, then, it may be seen that it may be problematic to identify and obtain desired information in a time frame necessary to make an acceptable decision.

SUMMARY

According to one general aspect, a computer system including instructions recorded on a computer-readable storage medium and readable by at least one processor may include a query handler configured to cause the at least one processor to receive a query which is applicable against different combinations of a plurality of remote databases and a corresponding plurality of replica databases including at least some replicated data of respective ones of the remote databases, wherein the query arrives at a plurality of query arrival times and is executed at a plurality of query execution times. The system may include a replication manager configured to cause the at least one processor to execute a synchronization plan for at least one selected replica database in which a selected synchronization timestamp of the at least one selected replica database is updated to a target synchronization timestamp, wherein the synchronization occurs during a synchronization processing time. The system may include a synchronization scheduler configured to cause the at least one processor to schedule the synchronization plan to increase an information value of a query response, including selecting the target synchronization timestamp including relating the synchronization processing time to a selected query execution time.

According to another general aspect, a computer-implemented method for causing at least one processor to execute instructions recorded on a computer-readable storage medium may include receiving a query which is applicable against different combinations of a plurality of remote databases and a corresponding plurality of replica databases including at least some replicated data of respective ones of the remote databases, wherein the query arrives at a plurality of query arrival times and is executed at a plurality of query execution times. The method may include initiating a synchronization plan for at least one selected replica database in which a selected synchronization timestamp of the at least one selected replica database is updated to a target synchronization timestamp, wherein the synchronization occurs during a synchronization processing time. The method may include scheduling the synchronization plan to increase an information value of a query response, including selecting the target synchronization timestamp including relating the synchronization processing time to a selected query execution time.

According to another general aspect, a computer program product may be tangibly embodied on a computer-readable medium and may include instructions that, when executed, are configured to cause at least one processor to receive a query which is applicable against different combinations of a plurality of remote databases and a corresponding plurality of replica databases including at least some replicated data of respective ones of the remote databases, wherein the query arrives at a plurality of query arrival times and is executed at a plurality of query execution times. The instructions, when executed, may cause the at least one processor to initiate a synchronization plan for at least one selected replica database in which a selected synchronization timestamp of the at least one selected replica database is updated to a target synchronization timestamp, wherein the synchronization occurs during a synchronization processing time. The instructions, when executed, may cause the at least one processor to schedule the synchronization plan to increase an information value of a query response, including selecting the target synchronization timestamp including relating the synchronization processing time to a selected query execution time.

The details of one or more implementations are set forth in the accompanying drawings and the description below. Other features will be apparent from the description and drawings, and from the claims.

DETAILED DESCRIPTION

Figure 1:
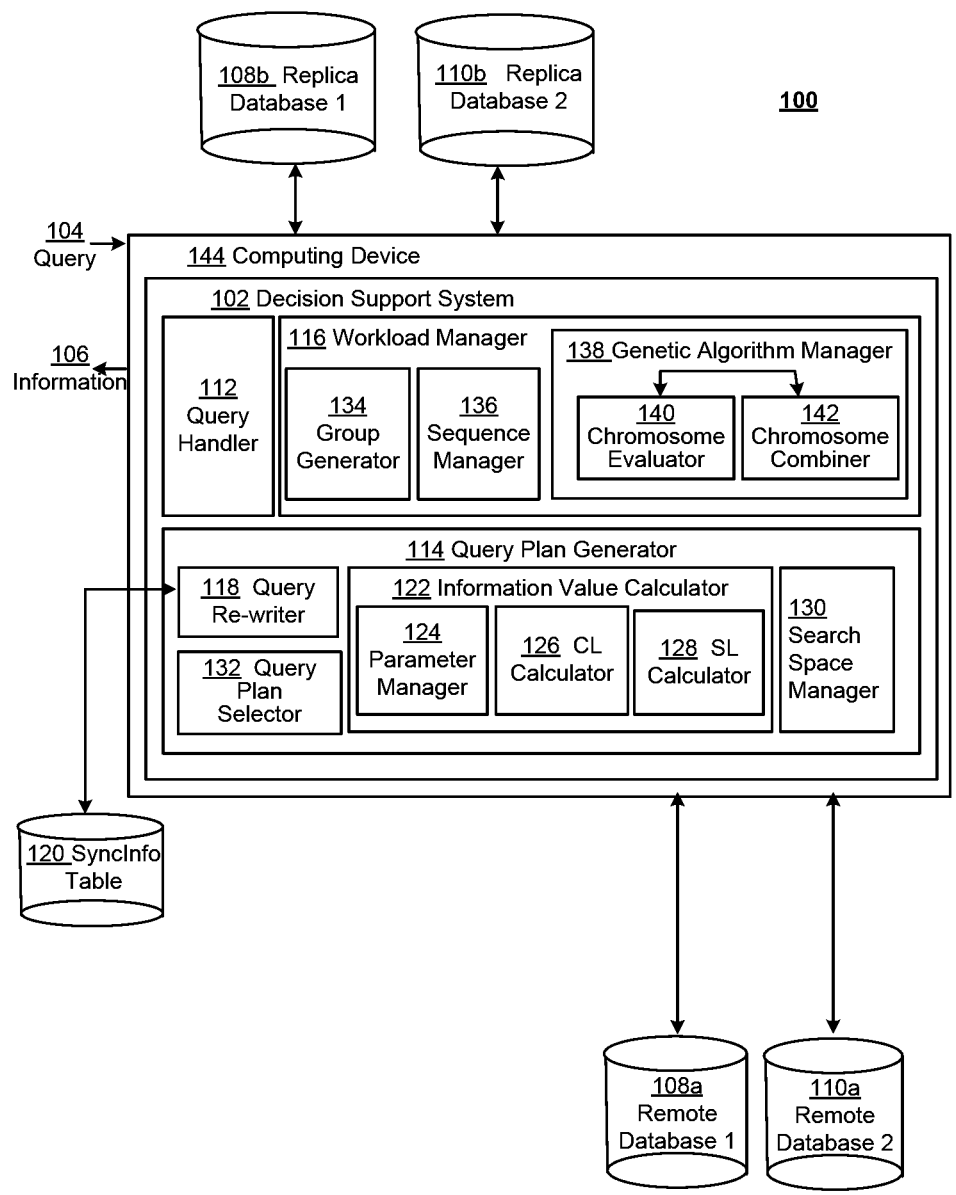
FIG. 1 is a block diagram of an information-value driven decision support system.

FIG. 1 is a block diagram of a system 100 for providing information-value driven decision support. In the example of FIG. 1, a decision support system 102 is illustrated which receives at least one query 104, and which provides information 106 in return. As may be appreciated, the information 106 may then be used by a human or automated user in making some relevant decision.

In FIG. 1, the decision support system 102 provides the information 106 in a manner that optimizes a value of thereof for a particular decision. For example, the decision support system 102 recognizes that the information 106 has a particular value to a decision maker, and that such value may be diminished or reduced in various ways, due to, e.g., system constraints that may exist when providing the information 106. For example, the value of the information 106 may be diminished due to a delay of the system 100 in providing the information 106, where such delay, if large enough, may cause the value of the information 106 to reduce to zero (e.g., when the information 106 is completely out of date, or when the decision maker has a deadline for the decision that passes before the information 106 is provided).

The system 100 of FIG. 1 illustrates that the decision support system 102 may have access to a remote database 108a, which may be replicated locally to the decision support system 102 as a replica database 108b. Similarly, the decision support system 102 may have access to a remote database 110a, which may be replicated locally to the decision support system 102 as a replica database 110b. In practice, the replica databases 108b, 110b may replicate all or only a portion of their respective remote databases 108a, 110a. Moreover, it will be appreciated that additional remote databases may be accessed by the decision support system 102 (although such additional remote databases are not specifically illustrated in FIG. 1 for the sake of conciseness), and that some or all of such additional remote databases may have some or all of their contents replicated to corresponding replica databases that are local to the decision support system 102.

One function of the decision support system 102 may thus include selecting an optimal query plan for executing to query 104 against a subset of the databases 108a, 108b, 110a, 110b so as to optimize the final value of the information 106. For example, a first such query plan may include executing the query 104 against the replica database 108b and the remote database 110a, while a second such query plan may include executing the query 104 against the replica database 110b and the remote database 108a. More generally, the decision support system 102 may determine a subset or combination of relevant, available databases, against which the query 104 may be executed in such a fashion as to obtain an optimal or near-optimal value of the information 106.

As referenced above, decision support system 102 may be implemented in virtually any setting where decision-making is implemented based on available stored or otherwise-obtained information, including the realms of business, legal, educational, governmental, health, military, and personal decisions. Other more specific examples include logistic, power grid, insurance (e.g. fraud detection), and finance (i.e. asset exposure and positioning, and short term financial planning) decisions. For purposes of consistency and clarity in the present description, specific examples will be given to the realm of business decisions, and, in particular, to financial decisions. However, it will be appreciated that the described concepts may easily be extended to different desired settings.

In this regard, the system 100 reflects the fact that many large companies, especially those in financial service sectors, approach the market with a decentralized management structure, such as by line of business or market segment. These companies require access to distributed and possibly heterogeneous data warehouses for business intelligence applications. Such companies seek to balance the central management control while constraining expenses, and, at the same time, maintain the flexibility for each line of business to react, service and sell to its segment of the market. Thus, FIG. 1 reflects a setup which allows business transactions to be executed at remote locations (e.g., branch level offices, which would be understood to house remote databases 108a, 110a in FIG. 1) while decision-making and complex business operation analysis tasks are performed at the headquarters. In some cases, it is important for such central decision-making and analysis to be executed using real-time or near real-time data, while in the same or other cases, it may be important to obtain access to the necessary data as quickly as possible (e.g., in advance of an imminent deadline).

It is possible to warehouse effectively all available data at a central site, but such an approach is sub-optimal when real-time or near real-time decisions are desired. On the other hand, it is possible to receive queries at such a central site and disperse the resulting multiple queries to remote databases.

Although the latter approach has the advantage of providing more up-to-date data, it may be difficult to continuously manage interactions of complex queries involving multiple sites, particularly at large scales. FIG. 1 thus represents a hybrid approach in which the decision support service 102 is at a central site relative to remote databases 108a, 110a, and is configured to replicate relatively small sets of frequently-accessed data to the replica databases 108b, 110b.

As referenced above, users (decision-makers) of the DSS 102 may be concerned with one or both of how fast and how recent the obtained data are. That is, for example, such users care about not only the response time but also the time stamp of a business operation report. For example, when an inquiry is submitted, a report, report 1, returned after 5 minutes with data time stamped 8 minutes ago has more accurate information than a report, report 2, returned after 2 minutes generated based on data time stamped 12 minutes ago. However, the report generated in 2 minutes may be sufficiently valuable due to its relative timeliness.

The two types of uncertainty just described are, referred to herein as computational latency (CL) and synchronization latency (SL). In this regard, computational latency refers to an amount of time from submission/issuing of the query 104 to retrieval/receipt of the resulting information 106, and may refer to any formulating, processing, transmitting, or any other computing operations that cause the information 106 to be received less than instantaneously. For example, the computational latency may be considered to include a summation of query queuing time, query processing time, and query result transmission time, where all these three values are measured by elapsed time, and where the query result transmission time is measured only for the queries running at remote servers. Computational latency results in uncertainty and risks due to not being able to make any decision (e.g., when a deadline is missed or the information 106 is otherwise received late).

Synchronization Latency (SL) refers to an amount of time from a most recent (or most relevant) synchronization of one of the replica databases 108b, 110b until the information 106 is received. For example, if the replica database 108b is updated at noon, the query 104 is submitted at 12:30, and the information 106 is received at 1:00, then the resulting synchronization latency would be an hour. Synchronization latency results in uncertainty and risk due to decision-making based on information that is outdated. It should be appreciated that computational latency and synchronization latency could and most likely will overlap.

Further examples of computational latency and synchronization latency are provided below (e.g., with respect to FIG. 4). In general, though, it may be appreciated that the DSS 102 of FIG. 1 may be operated so as to maximize, minimize, or otherwise balance these latencies and other factors which may impact the value of the information 106. For example, if the DSS 102 routes the query 104 to the replica databases 108b, 110b, then computational latency may be minimized (since the databases 108b, 110b are local to the DSS 102). On the other hand, if the DSS 102 routes the query 104 to the remote databases 108a, 110a, then synchronization latency may be minimized (since the databases 108a, 110a contain up-to-date data). Meanwhile, routing the query 104 to a combination or subset of the databases 108a, 108b, 110a, 110b may provide a balance between computational and synchronization latencies which may be most beneficial to providing the information 106 with a highest-possible value.

The DSS 102, in operation, thus receives the query 104 via a query handler 112, and a query plan generator 114 then formulates a decision as to how to route the query 104 within and among the databases 108a, 108b, 110a, 110b. More specifically, the query plan generator 114 determines which of the databases 108a, 108b, 110a, 110b should receive the query 104, and when the query 104 should be routed to a selected one of the databases 108a, 108b, 110a, 110b (e.g., whether to route the query 104 immediately or to wait for a future data synchronization before routing the query 104).

In order to formulate such a query plan, the query plan generator 114 seeks to maximize a value of the resulting information 106, i.e., seeks to determine an information value IV that reflects information best-suited to the decision-maker submitting the query 104. Eq. 1 represents an example technique for formulating such an information value:

$$IV = BV\,(1-\lambda_{CL})^{CL}(1-\lambda_{SL})^{SL} \qquad \text{Eq. (1)}$$

In Eq. (1), IV refers to the information value, while BV refers to a business value of the information. CL and SL refer to computational latency and synchronization latency, respectively, and the terms $\lambda_{CL}$ and $\lambda_{SL}$ refer to discount rates assigned to the respective type of latency. Thus, in practice, the term BV reflects the fact that some decisions (and supporting information) may be more important than others, either objectively or subjectively for a particular user. Such a business value (where, again, the reference to such a value in the business realm is but one example, and the more generic term value may be used in a more widely-applicable sense) thus represents a starting point or maximum value which might theoretically be obtained if CL and SL were zero (the ideal scenario where all data is fresh and up-to-date and obtained immediately). Of course, in practice, the values of CL and SL will not be zero, so that their magnitude and the magnitude of the decay rates $\lambda_{CL}$ and $\lambda_{SL}$ reflect an extent to which these various parameters decrease the information value IV for a particular user over a corresponding time frame.

By way of further discussion of relevant notations, in the present description replica databases such as the replica databases 108b and 110b may be referred to as $R_1, R_2 \ldots R_n$, while remote databases such as the remote databases 108a, 110a may be referred to as $T_1, T_2 \ldots T_n$. Thus, it may be stated that the query plan generator 114 is configured to generate a query plan which determines a use(s) of databases ($R_1, R_2, T_1, T_2$) such that IV is maximized for the information 106.

That is, as already referenced, when replica databases 108b, 110b are available, there are multiple plans (i.e., combinations of databases) for processing a query. For example, for a query with a join operation on T1 and T2, and assuming momentarily that the query 104 will be submitted immediately with no delay until a next synchronization, there are four query processing plans: (T1, T2), (R1, T2), (T1, R2), and (R1, R2). One such query processing scheme would select (R1, R2) over the other three plans for the single reason of better response time. However, with respect to the information value of the query result, (R1, R2) may not be the best choice since it may generate a lower information value than other plans, e.g., if R1 and R2 have been out of synchronization for a while. The DSS 102 and the query plan generator 114 thus operate to select a query plan that maximizes the information value IV.

In some implementations, it may be advantageous to at least consider delaying submission of the query. For example, it may occur that the replica database 108b was last synchronized fifty-eight minutes ago and is scheduled to synchronize every hour. In this case, waiting an additional two minutes (and thereby adding two minutes of computational latency) may be worth it to obtain a corresponding (and much larger) reduction in the synchronization latency, since the query 104 would be executed against freshly-synchronized data. Waiting for synchronizations in the manner may be analogized to using a different version (i.e., a future version) of the replica database in question. Then, as a matter of notation, such a future version of a replica database may be denoted as R1' for a first future synchronization, R1" for a second future synchronization, and so on. In effect, such future versions become additional candidate databases for forming possible combinations and associated query plans. For example, in addition to the four combinations referenced above, additional combinations of databases may be considered to be available, including, e.g., (R1', T2) or (T1, R2").

Further in FIG. 1, a workload manager 116 is configured to consider that the query 104 may represent a plurality of queries, and, more specifically, is configured to optimize the information value of a set or workload of multiple queries as a whole. For example, a query plan for a first query may yield a high IV for resulting information, but, e.g., due to constraints imposed on the system 100 by the processing of this first query, a second query may experience a very long computational latency which may severely reduce the IV if its resulting information. Consequently, in these and other examples, the workload manager 116 may be configured to select a sequence of a plurality of set of queries which optimizes the information value of the set as a whole. Operations of the workload manager 116 are described in more detail below, and, in particular, are discussed in detail with respect to FIGS. 8 and 9, below.

During operation of the DSS 102, then, the query 104 is received at the query handler 112, which routes the query 104 and associated information to one or both of the query plan generator 114 and the workload manager 116. In this regard, and turning to more detail of the query plan generator 114, a query re-writer 118 may be included and configured to rule out, during the generation of the query plan(s), the possibility of the information 106 being incorrect due to, for example, different synchronizations or synchronization rates of the databases 108a, 108b, 110a, 110b. For example, the replica database 108b may be synchronized with the remote database 108a at a certain time, while the database 110b may be synchronized with the remote database 110a at a later time. In an intervening time between the two synchronizations, the data in one or both databases 108a, 110a may change. As a result, for example, the combination of such out-of-date data with altered-in-the-meantime data may cause the information 106 to be factually incorrect, e.g., may return a result that does not match any actual scenario of the data.

In general, the query re-writer 118 of the DSS 102 of FIG. 1 may be configured to examine such data and to ensure that within a dataset being examined (e.g., merged or joined), all the data are selected using the earliest timestamp thereof. That is, the query re-writer 118 contemplates the possible use of relatively older data than might otherwise be available (and thereby incurring additional synchronization latency), in order to ensure consistent and correct results.

In particular, the query re-writer 118 may maintain and consult a synchinfo table 120 that tracks timestamps of synchronized data (i.e., tracks specific times at which each piece or set of data was synchronized). Further, the query re-writer 118 may use the synchinfo table 120 based on what operation is desired to be performed (e.g., insertion versus deletion of data) in order to minimize the amount of additional synchronization latency that is tolerated for the purpose of maintaining consistency of the information 106. Specific examples of the use and operation of the query re-writer 118 and the synchinfo table 120 are provided below, e.g., with respect to FIG. 3.

Upon re-writing, the query 104 may be passed to an information value calculator 122, which, as already described, is configured to consider possible query plans and to assign an information value IV to each one, using Eq. (1), above. In this regard, the information value calculator 122 may include a parameter manager 124 that is configured to receive, calculate, or otherwise determine parameters that may be specified by, or derived from, preferences of the relevant user (decision-maker). In the example of Eq. (1), these parameters include the business value BV and the decay rates $\lambda_{CL}$ and $\lambda_{SL}$.

For any of these parameters, the parameter handler 124 may simply receive values and preferences (e.g., priority levels) directly from the relevant decision-maker, e.g., by way of an appropriate graphical user interface (GUI) for receiving such preferences. In other examples, various rules, criteria, and/or conditions may be in place which the parameter manager 124 may use to derive or determine one or more of the parameters.

For example, the business value BV may be a relative term normalized to a value between 0 and 1. For a particular query and associated data, the parameter manager 124 may access rules and/or determine current conditions of the system 100 to assign a value to BV. For example, queries related to inventory may be assigned a higher BV than queries related to human resources. Or, queries submitted by a particular user (e.g., a CEO) may automatically be assigned a higher BV. The value for BV may be adjusted higher or lower for a certain query if the system 100 is particularly highly-utilized at the moment, or differently if the system 100 is not being highly-utilized.

Somewhat similarly, the decay rates $\lambda_{CL}$ and $\lambda_{SL}$ may be received directly from the decision-maker or other user. It may be appreciated from the nature of Eq. (1) that assigning higher decay rate(s) alters a relative importance or impact of the CL or SL. For example, if the information 106 is associated with an imminent deadline, then the decay rate $\lambda_{CL}$ may be increased, while the decay rate $\lambda_{SL}$ may be relatively decreased. On the other hand, if there is no imminent risk of the information 106 being late, but if it is important that the information 106 be up-to-date (fresh), then the value of the decay rate $\lambda_{SL}$ may be increased relative to that of the decay rate $\lambda_{CL}$. In a third example, both decay rates $\lambda_{CL}$ and $\lambda_{SL}$ may be relatively large so that the overall IV will decay relatively rapidly overall.

As with the business value BV, the decay rates $\lambda_{CL}$ and $\lambda_{SL}$ may also be calculated from a set of rules, conditions, or criteria. For example, certain types of queries may be known to be related to content having frequent or imminent deadlines, which may be reflected in calculation of the decay rate $\lambda_{CL}$. Similar comments apply to queries related to subject matter typically requiring very up-to-date or fresh data with respect to the impact on selection of decay rate $\lambda_{SL}$.

The information value calculator 122 further includes a CL calculator 126 and a SL calculator 128 to determine the computational latency and synchronization latency, respectively. Such calculations may be executed using known factors and techniques in the manner(s) described herein, are discussed in greater detail below (e.g., with respect to FIGS. 3 and 4), and consequently are not discussed here in detail for the sake of clarity and conciseness.

Although the example of FIG. 1 illustrates a simple example including only two remote databases and two replica databases, it may be appreciated that a larger number of databases may be contemplated and used. Consequently, a number of possible combinations of databases for inclusion in potential query plans may rise exponentially for situations with such relatively large numbers of databases.

Thus, in FIG. 1, a search space manager 130 may be configured to limit a search space of possible combinations of databases when optimizing information value for available query plans. In particular, as discussed in greater detail with respect to FIG. 6, the search space manager 130 may implement a scatter-and-gather algorithm which selects a current optimal query plan, and then rules out query plans which are thought not to be better than the current optimal query plan, and then determines if a new optimal query plan is available within the remaining available query plans.

This process may be repeated until a search space of query plans is sufficiently restricted to allow examination and calculation of the final optimal query plan. In this regard, a query plan selector 132 may be used to determine whether and when the search space is sufficiently restricted, and to select the final optimal query plan from remaining query plans at that time.

As referenced above, when multiple queries (e.g., 104 and 104') are submitted, the query plan generator 114 may determine at least one possible query plan for each query. Then, it may occur that one such query may be scheduled or planned to start prior to finishing of the other query, so that, in this sense, the two queries overlap. In such a situation, the queries may compete for resources of the system 100, and, if such competition is left unconsidered, the decision-maker may obtain an undesired result. For example, as already referenced, the resource competition may increase a computational latency of one of the queries to a point where its information value is decreased to an unacceptable level. These and other factors which may impact information value(s) of a query or group of queries may be managed, e.g., by changing a sequence and timing with which the queries are submitted. Therefore, the workload manager 116 may consider such overlapping queries as a group(s) and may seek to sequence each group so as to, e.g., maximize the information value of the group as a whole.

The workload manager 116 is thus illustrated as including a group generator 134 which examines individual queries and determines groups of which may overlap during execution. Then, a sequence manager 136 may examine different sequences of the group of queries to determine which sequence is best. In the latter regard, a genetic algorithm manager 138 may be used to examine a search space of the available sequences by representing the sequences as chromosomes and then implementing an evolutionary process of evaluating the chromosomes using a chromosome evaluator 140 and then combining pairs of the highest-rated of the evaluated chromosomes using a chromosome combiner. In this way, an evolutionary loop is created in which each successive generation of chromosomes, on the whole, is more likely to provide an optimal workload for processing the group of queries to obtain the optimal IV for the workload as a whole. Additional operations of the workload manager 115, including the genetic algorithm manager 138, are described below with respect to FIGS. 8 and 9.

In FIG. 1, the DSS 102 may be executed on a computing device 144, which may represent one or more computing devices, any of which may be used to implement one or more of the components of the DSS 102. For example, as referenced above, the computing device 144 may represent a server that is used to execute a data management system which combines warehousing of data in local replica databases 108b, 110b along with distribution of queries as-needed to remote databases 108a, 110a. The computing device 144 may thus be understood various standard components associated with standard function of a decision support system, including components for, e.g., replicating data, transmitting queries and receiving information (data) in return. The computing device 144 may be understood to further include standard components of one or more database management system(s) which may be used to execute operations (e.g., queries) using the various databases 108a, 108b, 110a, 110b. These and other standard components are not illustrated in FIG. 1 explicitly for the sake of clarity and conciseness.

Figure 2:
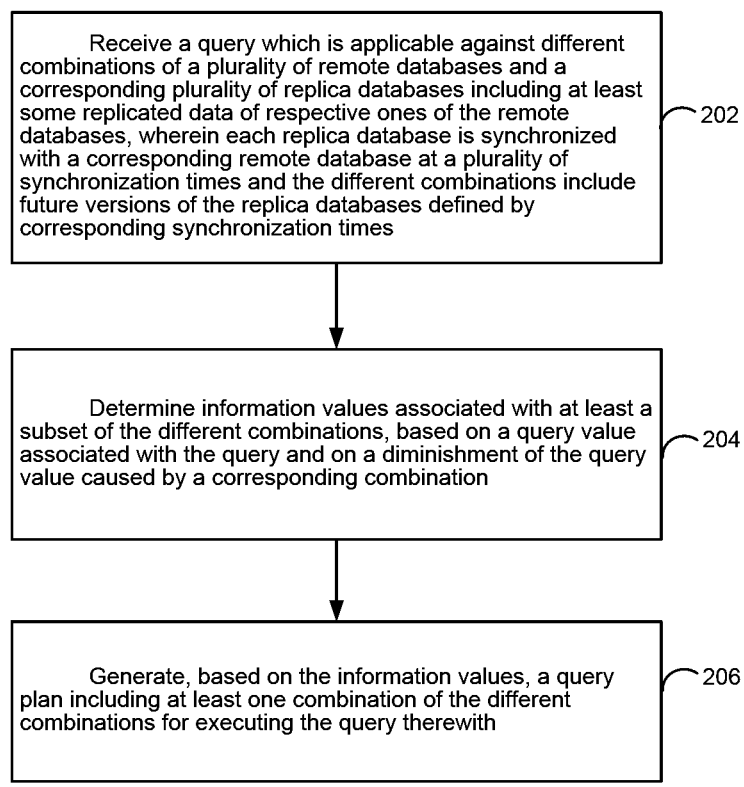
FIG. 2 is a flowchart illustrating example operations of the system of FIG. 1.

FIG. 2 is a flowchart 200 illustrating example operations of the system of FIG. 1. In the example of FIG. 2, operations 202, 204, 206 are illustrated as sequential operations. However, it may be appreciated that this is merely for ease of illustration and description, and that in reality the various operations 202, 204, 206 may overlap, or occur in parallel, or (except where specified otherwise) may occur in a different order.

Figure 5:
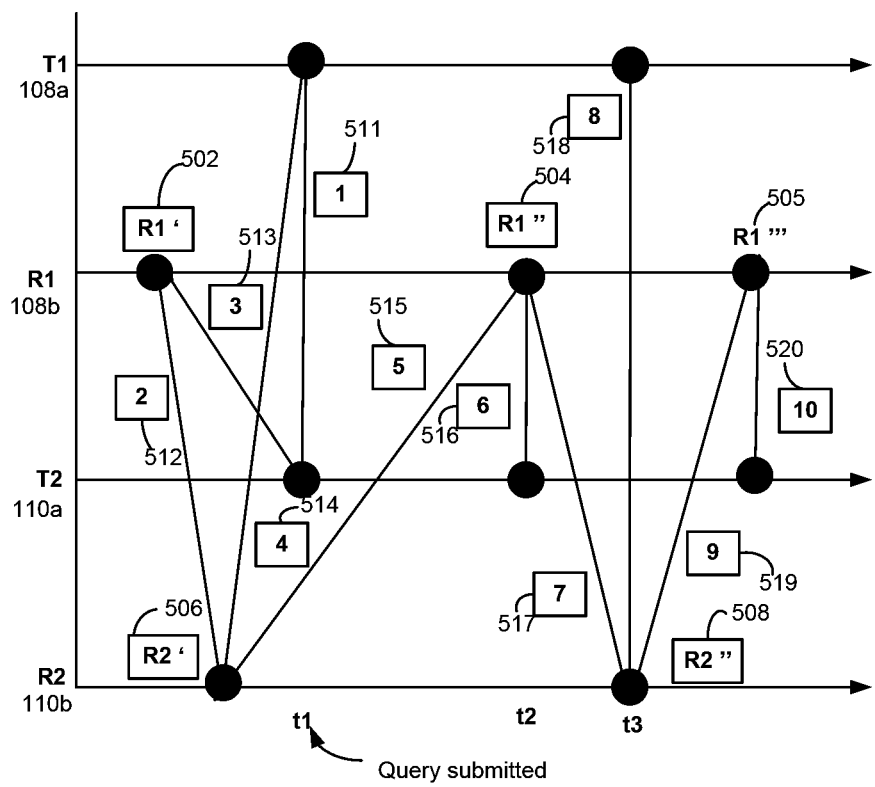
FIG. 5 is a block diagram of first example query plans from which the system of FIG. 1 may select.
Figure 6:
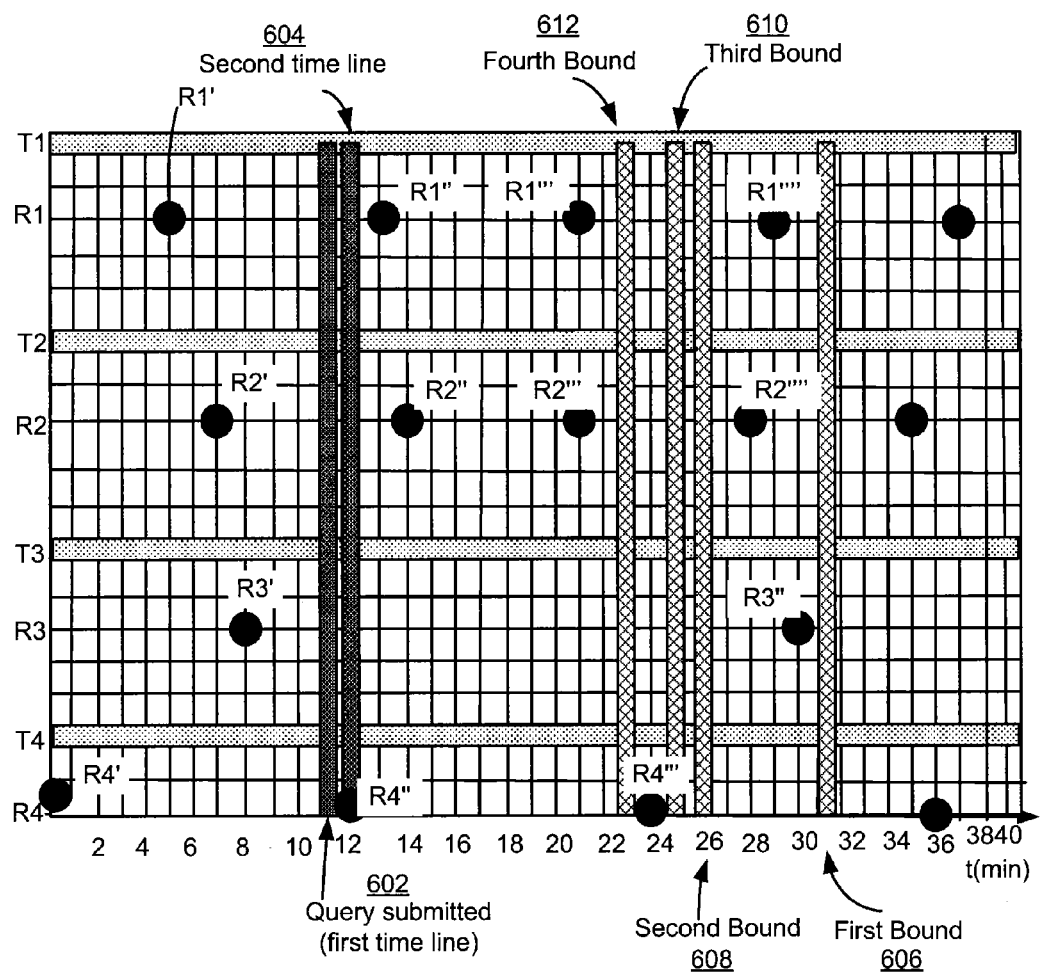
FIG. 6 is a block diagram of second example query plans from which the system of FIG. 1 may select, illustrating management of the search space of the query plans when selecting an optimal query plan.

In FIG. 2, then, a query is received which is applicable against different combinations of a plurality of remote databases and a corresponding plurality of replica databases including at least some replicated data of respective ones of the remote databases, wherein each replica database is synchronized with a corresponding remote database at a plurality of synchronization times and the different combinations include future versions of the replica databases defined by corresponding synchronization times (202). For example, the query handler 112 of the DSS 102 may receive the query 104. The query 104 may be applicable against different combinations of the remote databases 108a, 110a, and against corresponding replica databases 108b, 110b. As described herein, each replica database 108b, 110b may be synchronized against their respective databases 108a, 110a, e.g., according to a synchronization schedule(s) which dictates into the future a time and manner in which the synchronizations will occur. The combinations may include combinations (T1, T2), (R1, T2), (T1, R2), and (R1, R2) of the databases 108a, 108b, 110a, 110b, as described above, and also may include additional combinations such as, (R1', T2), (T1, R2'), and (R1", R2'), to name a few, where R1'/R2' and R1" refer respectively to first and second future synchronizations of the replica databases 108b, 110b. FIGS. 5 and 6 provide illustrations of such combinations, as described in detail, below.

Information values associated with at least a subset of the different combinations may be determined, based on a query value associated with the query and on a diminishment of the query value caused by a corresponding combination (204). For example, the query plan generator 114, and in particular the information value calculator 122, may determine a query value associated with the query 104. Such a query value is described herein using the specific example of a business value, but it will be appreciated from the above description that a similar type of query value may be determined for virtually any query in any of the realms in which the DSS 102 is applicable and useful. As described herein, each of the different combinations is associated with a greater or lesser computational latency and/or synchronization latency, which may be used with corresponding decay rates, e.g., as described in Eq. (1), to determine a diminishment or decay of the query value that is associated with each selected combination of the databases 108a, 108b, 110a, 110b (and future versions thereof).

Based on the information values, a query plan may be generated including at least one combination of the different combinations for executing the query therewith (206). For example, the information value calculator 122 may output the information values and the query plan selector 132 may select a query plan using the combination having the highest one of the information values.

Figure 3:
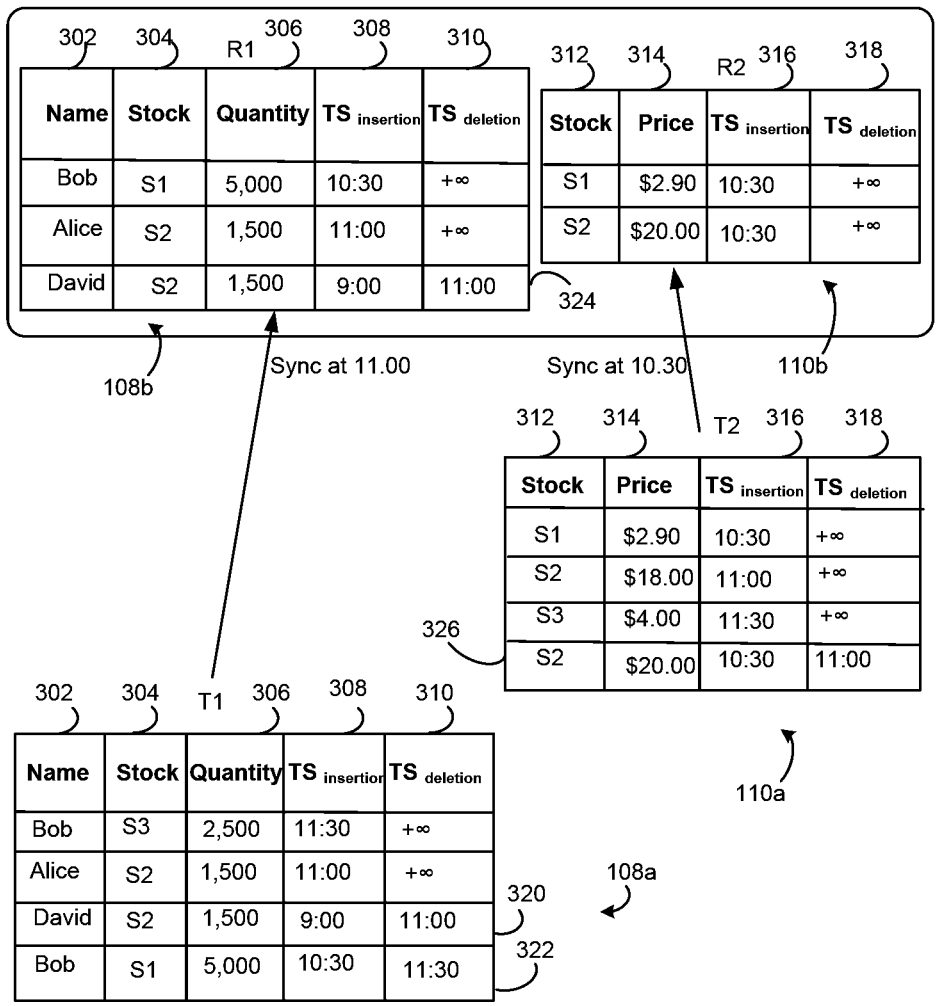
FIG. 3 is a block diagram of tables used to execute timestamp based join operations in the system of FIG. 1.

FIG. 3 is a block diagram of tables used to execute timestamp based join operations in the system of FIG. 1. Specifically, as referenced above, FIG. 3 illustrates scenarios which imply use of the query re-writer 118 of FIG. 1.

In FIG. 3, table 108a (i.e., an abbreviated table representing at least some content of the remote database 108a, notated as T1) is synchronized with table 108b (i.e., an abbreviated table representing at least some content of the replica database 108b, notated as R1) at 11:00. Similarly, table 110a (i.e., an abbreviated table representing at least some content of the remote database 110a, notated as T2) is synchronized with table 110b (i.e., an abbreviated table representing at least some content of the replica database 110b, notated as R2) at 10:30.

As shown, the tables 108a, 108b include columns 302, 304, and 306, which respectively list information on a name, stock, and quantity (of stock) for a plurality of persons. Meanwhile, the tables 110a, 110b include columns 312 and 314 respectively list data on a stock and its corresponding price.

As already described, in the system of FIG. 1, replicas are placed at a local server to improve performance of complex queries over distributed databases or other data sources. With the presence of replica databases in the system, as described, the query re-writer 118 may be used to maintain consistence and integrity of the query results as if the query 104 were running over base tables on a single server. The replica databases; however, are synchronized individually and perhaps according to difference schedules. As a result, operations performed on the replica databases 108b, 110b (e.g., a join operation) may result in inaccurate and inconsistent results within the information 106.

For example, in FIG. 3, a decision-maker may issue a query requesting the return of names of all stockholders whose properties are no less than $300,000. If R1 and R2 are chosen to answer such a query because of efficiency considerations, Alice will be returned by joining R1 with R2. As shown, such a join operation results in a tuple indicating Alice owns stock S2 at the price of $20 with quantity of 1,500.

The result, however, may not be true in reality given that R1 was last synchronized 30 minutes later than R2 was. In the example of FIG. 3, it may occur that another stockholder, David, sold his 1,500 shares of S2 stock to Alice at 11:00 and at that time, the price of stock S2 has decreased to $18.00 (as shown in T2). Thus, Alice's property has never reached $300,000 and the result derived by simply joining R1 and R2 is inconsistent with reality and should never occur.

It is possible to avoid such an inconsistent result, if feasible and if an associated delay is tolerable, by replicating all databases which are updated in the same transaction to DSS, either all together or not at all. In other implementations, time stamps may be associated with all the database tables, and then operations such as the join operation may be executed based on such timestamps.

In particular, such a time stamp-based join in query processing may contemplate that each replica is associated with a last synchronization time stamp, and each tuple is associated with an insertion time stamp as well as a deletion time stamp, as shown in columns 308/310 and 316/318, indicating a valid life period of that tuple. When a query accesses multiple tables (replicas and/or remote tables) with different last synchronized time stamps, a condition is added by the query re-writer 118 to access only the rows with time stamps consistent with the earliest time stamp among all tables. Such a time stamp-based join operation provides integrity and consistency of results, even when remote tables and replica tables are updated and synchronized independently.

FIG. 3 illustrates that in order to enable consistent join operations regardless of which replica database is used, tuples should be maintained with a deletion time stamp $TS_{deletion}$ that is later than the earliest last synchronization time stamp among all replica databases. In the example of FIG. 3, R1 is last synchronized at 11:00 and R2 at 10:30, so that tuples with deletion time stamp later than 10:30 should be kept (shown as rows 320, 322, 324, 326 of FIG. 3).

Then, for example, if a user issues a query to return names of all stockholders whose stock portfolio values are no less than $300,000, then if R1 and R2 are chosen to evaluate the query, only tuples with an insertion time stamp earlier than 10:30 and deletion time stamp later than 10:30 should be involved in the join, so that the result includes David, with time stamp 10:30, which is consistent with reality. Thus, the described time-stamp based join contemplates computing a result using a snapshot of all tables at 10:30 to respect consistency.

In practice, the above description should be sufficient to implement one of a number of techniques and implementations for the described time-stamp based join. FIG. 1 above describes one such example, in which an auxiliary table, synchinfo table 120, is maintained at the local server to store and retrieve synchronization information (i.e. the last synchronization time stamp of each replica). The query re-writer 118 may then rewrite a query into a time stamp-based query.

More formally, the user may issue a query involving a number of replica databases and/or remote (base) tables with a form shown in Code section 1:

| Code Section 1 |
| --- |
| SELECT select-list<br>FROM $R_{i1},R_{i2},\ldots,R_{im}, T_{j1},T_{j2},\ldots,T_{jn}$<br>WHERE qualification | in which Ri1; Ri2; : : : ; Rim are replica databases and Tj1; Tj2; : : : ; Tjn are remote/base tables deployed to evaluate the query. The query may then be rewritten in a manner which realizes the functionality of computing from the synchronization information table 120 the earliest last synchronization time stamp among all replicas involved in the query evaluation.

The query may then be incorporated with the constraints on the time stamps of the tuples, as shown in Code Section 2:

| Code Section 2 |
| --- |
| Create Procedure EarliestTS($R_1, R_2, \ldots, R_i$)<br>AS<br>SELECT @ets = MIN($TS_{sync}$)<br>FROM SyncInfo<br>WHERE Replica IN('$R_1$', '$R_2$',...,'$R_i$')<br>RETURN @ets<br>ets = EarliestTS($R_i, R_{i2}, \ldots, R_{im}$);<br>SELECT select-list<br>FROM $R_{i1}, R_{i2}, \ldots, R_{im}, T_{j1}, T_{j2}, \ldots, T_{jn}$<br>WHERE qualification AND<br>    (ets BETWEEN $R_{i1}, TS_{insertion}$, AND $R_{i1},TS_{deletion}$)AND<br>    (ets BETWEEN $R_{i2},TS_{insertion}$, AND $R_{i2},TS_{deletion}$)AND<br>    . . .<br>    (ets BETWEEN $R_{im},TS_{insertion}$, AND $R_{im},TS_{deletion}$)AND<br>    (ets BETWEEN $T_{j1},TS_{insertion}$, AND $T_{j1},TS_{deletion}$)AND<br>    (ets BETWEEN $T_{j2},TS_{insertion}$, AND $T_{j2},TS_{deletion}$)AND<br>    . . .<br>    (ets BETWEEN $T_{jn},TS_{insertion}$, AND $T_{jn},TS_{deletion}$) |

Further, operations such as insertions, deletions, and updates may also be rewritten into time stamp-based operations. For example, for an insert operation, when a tuple is inserted, its insertion timestamp may be set as the time it is inserted, and its deletion time stamp is set as +infinity. For a delete operation, it may be appreciated that deleting a tuple may involve reference to the synch-info table 120. In particular, if such reference reveals that the deleting time is later than the earliest last synchronization time among all replica databases, the tuple to be deleted may be maintained for the time being, and its deletion time stamp may be safely deleted. Otherwise, the tuple can be safely deleted. In a final example, an update operation may be executed by performing a rewrite into a delete-and-insert operation. In such an operation, the original tuple may be deleted as described above, and then the tuple with updated value(s) may be inserted.

In FIG. 3, it may be observed that as synchronizations occur, an earliest synchronization time among all replicas may be pushed forward, and tuples with deletion time earlier than the earliest synchronization time may be safely discarded. Thus, a number of deleted tuples maintained to enable time stamp-based join does not necessarily increasing monotonically. In addition, assuming frequent comparisons on the time stamp attributes, indices may be built on these attributes to speed up the query evaluation process.

Using the techniques described above with respect to FIG. 3, formal definitions of computational latency and synchronization latency may be provided for when the time stamp-based join is deployed. Specifically, if a query Q is issued at time stamp $ts_{issue}$ and evaluated using m replica databases $R_{i1}$, $R_{i2}$, ..., $R_{im}$, with last synchronization time stamps $ts_{i1}$ ... $ts_{i2}$, ..., $ts_{im}$, as well as n base/remote tables $T_{j1}$, $T_{j2}$, ..., $T_{jn}$. Time stamp-based join indicates that the time stamp of the result should be the same as the earliest last synchronization time stamp among all replicas, denoted by $ts_{sync} = \min\{ts_{i1}, ts_{i2}, \ldots, ts_{im}\}$. Then, if $ts_{receive}$ is the time stamp when the query result is received, then the computational latency is $CL = ts_{receive} - ts_{issue}$, and the synchronization latency is $SL = ts_{receive} - ts_{sync}$. It may be appreciated that the time-stamp based operations provided with respect to FIG. 3 are merely examples, and that various other techniques may be contemplated to achieve the same or similar results.

Figure 4:
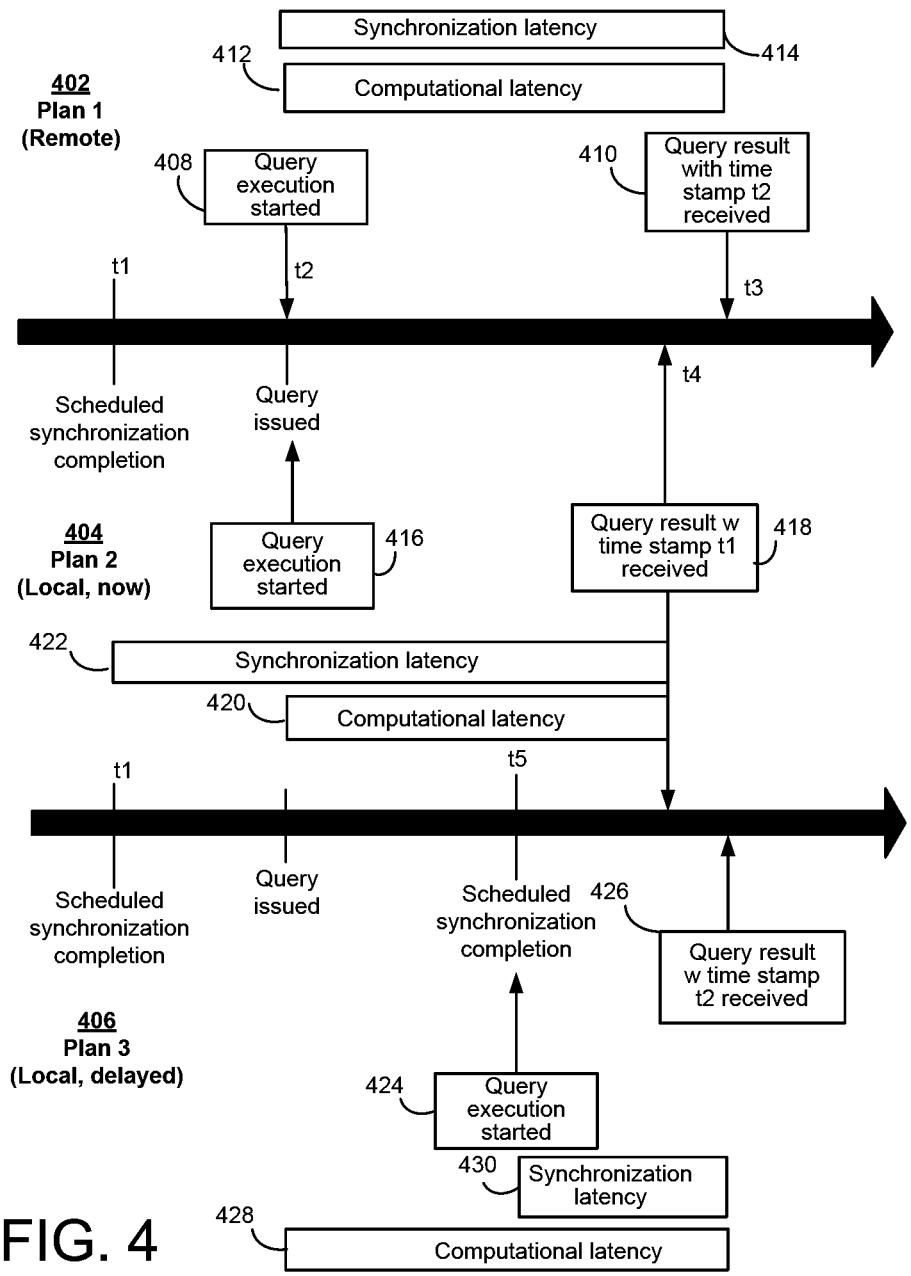
FIG. 4 is a timing diagram illustrating sample execution scenarios for queries of the system of FIG. 1.

FIG. 4 is a timing diagram(s) illustrating sample execution scenarios for queries of the system 100 of FIG. 1. Specifically, FIG. 4 illustrates three query plans 402, 404, 406 for distributing the query 104 in a simple example in which the query 104 is distributed to just a single database (e.g., either the remote database 108*a* or the local database 108*b*).

In the query plan 402, the query 104 is sent to the remote database 108*a*. In the query plan 404, the query 104 is sent immediately to the local, replica database 108*b*. In the query plan 406, the query 104 is sent to the local, replica database 108*b*, but is purposefully delayed until an immediately following synchronization time.

Thus, in query plan 402, query execution 408 is started at a time t2 at the same time that the query is issued. The query result (e.g., information 106) is received 410 at a time t3, but with a timestamp t2 representing the time that the retrieved data existed and was in the state as returned to the DSS 102. Consequently, it may be seen that a computational latency 412 occurs which is the difference between times t3 and t2. Moreover, since the remote database 108*a* is up-to-date by definition, the synchronization latency 414 in this case is the same as the computational latency 412. Thus, executing the query 104 at remote database 108*a* (e.g., using a corresponding remote server(s)) has the advantage of querying on up-to-date data; however, it will take a longer time in query processing (i.e. longer computational latency than sending the query immediately to the local replica database 108*b* as in the query plan 404). Nonetheless, since the data at the remote database 108*a* may change as soon as the query execution at the remote location begins, the query result and the database may be out of synchronization as long as the computational latency, as just referenced and as illustrated in FIG. 4.

In query plan 404, the query is executed at the local replica database 108*b*. Specifically, query execution 416 again begins at the time t2 when the query is issued, but is received 418 more quickly than in the query plan 402, at an earlier time t4. Here, however, the time stamp of the query result is the time t1, representing a most-recent synchronization of the replica database 108*b*. Thus, computational latency 420 is reduced to the difference between t4 and t2, while the synchronization latency 422 is increased to the difference between t4 and t1, both as shown in FIG. 4.

Comparing the plans 402 and 404, it may be observed that the plan 402 has a longer computational latency 412 but a shorter synchronization latency 414 than that of the query plan 404. Consequently, if the discount rate of computational latency $\lambda_{CL}$ is smaller than the discount rate of synchronization latency $\lambda_{SL}$, then according to Eq. (1) above, the query plan 402 may achieve a better information value than the query plan 404. On the other hand, the query plan 404 may generate a better information value if the discount rate of computational latency $\lambda_{CL}$ is larger than the discount rate of synchronization latency $\lambda_{SL}$. In other words, to maximize information value, the selection between query plans 402, 404 depends the computational latencies and synchronization latencies caused by the two plans, respectively.

In the query plan 406, the query 104 is again issued at the time t2, but query execution does not start 424 until a scheduled synchronization is completed at a time t5. The query result 426 is received at a time t3 having the timestamp of t2, as shown. Thus, computational latency 428 occurs equivalent to the difference between t3 and t2, as shown, while a synchronization latency 430 is defined as a difference between t3 and t5, also as shown.

Thus, the query plan 406 illustrates that when the query 104 is issued between two synchronization cycles (i.e., t1 and t5), then the future version of the replica database 108*b* that exists once the synchronization is complete may be considered effectively as a separate database to which the query 104 may be sent. In this example, the query plan 406, which delays the execution, introduces more computational latency 428, but with the potential benefit of reduced synchronization latency 430. If the discount rate of synchronization latency $\lambda_{SL}$ is greater than the discount rate $\lambda_{CL}$ of computational latency, then according to Eq. (1), such a delayed plan is probable to generate a greater information value than executing the query 104 immediately, as in the query plan 404.

The examples of FIG. 4 indicate that, to maximize information value in a business or other operation, a proper query plan should be carefully selected. The DSS 102 may thus be configured to select a plan that generates the maximal information value. In this regard, the concept of information value impacts query processing in the DSS 102 by recognizing that executing the query at remote databases may utilize up-to-date data, but may introduce longer computation latency. Executing the query at the local, replica database takes less response time while the drawback is that the replica databases may be out of synchronization for a longer time. Of course, a tradeoff is to leverage the combination of remote and replica databases, as described in more detail below, e.g., with respect to FIGS. 5 and 6. However, no single one of these approaches will always be optimal; rather, maximizing information values also depends on users' preference(s) represented by discount rates of computational latency and synchronization latency, as already described.

Further, as just illustrated, the DSS 102 may be configured to determine a query plan by considering whether the query 104 should be executed at the local replica databases, and, if so, whether to do so immediately or to wait for an upcoming synchronization point(s). As also just described, a reason for considering these options is that delaying a query execution until a future synchronization may possibly result in shorter synchronization latency. Again, user preferences may be incorporated into the information value optimization to determine a proper execution plan that maximizes the information value.

FIG. 5 is a block diagram of first example query plans from which the system of FIG. 1 may select. In FIG. 5, the query plan generator 114 considers query plans for executing the query 104 submitted at a time t1, using the databases 108*a*, 108*b*, 110*a*, 110*b* of FIG. 1, as shown, where again the databases are respectively referred to notationally as T1, R1, T2, R2. Then, using the notation defined above, a first synchronization of R1 108*b* occurs at R1' 502, while a second synchronization of R1 108*b* occurs at R1" 504 and a third synchronization at R1'" 505. Similarly, a first synchronization of R2 110*b* occurs at R2' 506, while a second synchronization of R2 108*b* occurs at R2" 508. It may be noted that the synchronization cycles/schedules of R1 and R2 are different and independent of one another. Then, in FIG. 5, query plans 511-520 are illustrated as query plans 1-10. For example, query plan 511 is to send the query 104 to the databases (T1, T2), while the query plans 512-520 use, respectively, (R1', R2'); (R1', T2); (T1, R2'); (R1", R2'); (R1", T2); (R1", R2"); (T1, R2"); (R1'", R2"), and (R1'", T2).

When the query 104 is submitted at time t1, the plans 511-514 are available for immediate execution. FIG. 5 also illustrates the options of delaying execution by waiting for R1" to complete at a time t2, at which point the plans 515, 516 become available for immediate execution at time t2. Similarly, when R2' is synchronized and becomes R2", plans 517, 518 become available, and when R1" is synchronized and becomes R1'" plans 519 and 520 are available. In FIG. 5, query plans 519 and 520 (and any succeeding query plans, not shown) may be immediately discarded because any query plan using time stamps newer than R1" 504 and R2" 508 will be inferior to plans 511-518 and will have lower information values, regardless of how the discount rates $\lambda_{CL}$ and $\lambda_{SL}$ are chosen. For the same reason, query plans using R2' 506 and any version prior to R1' 502.

Although in FIG. 5, eight plans 511-518 are illustrated, the CL calculator 126 need only compile the query 104 four times for the configurations (R1, R2), (R1, T2), (T1, R2), and (T1, T2) to generate their computational latencies. Moreover, the CL calculator 126 needs to perform this calculation only once, and may do so in advance. On the other hand, the SL calculator 128 may calculate synchronization latencies during a plan selection phase for each query plan. Then, the information values for the various query plans may be calculated by the information value calculator 122 using, e.g., Eq. (1). In example implementations, if all queries to be routed are registered in advance and a replication manager (not shown) is deployed to ensure updates to a remote database 108*a*, 110*a* is propagated to its replica database 108*b*, 110*b* at the DSS 102 within a pre-defined time frame, information values of all queries may be pre-calculated for routing.

FIG. 6 is a block diagram of second example query plans from which the system of FIG. 1 may select, illustrating management of the search space of the query plans when selecting an optimal query plan. For example, the search space manager 130 of FIG. 1 may be configured to execute a scatter-and-gather algorithm or other technique for reducing a search space of possible combinations of databases to use in executing the query 104.

In FIG. 6, consistent terminology with FIGS. 1-5 is used to denote the use of four remote databases T1-T4, along with corresponding replica databases R1-R4. As in FIG. 5, each replica database may be updated and synchronized a plurality of times within a given search space of possible query plan combinations. For example, R1 is synchronized at, e.g., R1', R1", R1'". Similarly, R2 is synchronized at R2', R2", R2'", and R2'". R3 is synchronized at R3', R3", and R4 is synchronized at R4' and R4".

In FIG. 6, for the sake of example and simplicity, it is assumed that computation latency is 2 minutes if the query evaluation only uses the replica databases R1-R4, and 4, 6, 8, and 10 minutes if the query evaluation involves T1, T2, T3, and T4 remote databases. Further, again for example and simplicity, a decay rate for both $\lambda_{CL}$ and $\lambda_{SL}$ are assumed to be 0.1.

The query is submitted at time stamp 11, and the latest synchronization when the query is submitted is time stamped of R3' at 8 minutes, as shown. Denoting computational latency CL as "y" and synchronization latency SL as "x,", Eq. (1) above may be executed as $IV=BV(0.9)^x(0.9)^y$.

In execution, in FIG. 6, a current optimal solution is selected. By default, the first such optimal solution may be selected simply using the assumption that the remote databases T1-T4 should be used. Then, for such a current optimal solution with information value IV(opt), then the longest computational latency tolerable to wait for a better solution may be bounded. Specifically, such a determination may proceed from the assumption that if synchronization latency will not result in any discount, there is a maximum computational latency before the information value becomes less than IV(opt). Such a boundary limits the searching space. Then, if a better solution for IV(opt) is found, the boundary may be moved in further.

In a specific example of such techniques, a scatter-and-gather technique is used. During a first (scatter) phase, in FIG. 6, the current time is considered to be 11, when the query is submitted. Again assuming a default optimal plan of T1-T4, it may be seen from the assumptions above that the computational latency is 10, and, since only the remote databases T1-T4 are used, the synchronization latency will also be 10. Thus the information value may be computed as $IV(opt)=BV(0.9)^{10}(0.9)^{10}$. Thus, it may be observed that the longest computational latency that may occur before the IV(opt) is necessarily reduced is 20 (i.e., adding the exponentials 10+10), so that a first boundary 606 is set at a time of 11+20, or 31, as shown.

Then, during a second (gather) phase, query plan combinations may be computed using the replica databases R1-R4. The gather phase uses the observation that synchronization latency is decided by the earliest synchronized table, which in FIG. 6 is R4 (i.e., R4'). That is, varying the combination of other databases will not generally reduce synchronization latency. For example, using {T1, R2', R3', R4'} to evaluate the query will not reduce synchronization latency since R4 is the earliest synchronized and has the most out-of-date data.

Thus, the current order of the replica databases may be recorded as R4', R1', R2', and R3', as shown in FIG. 6. Then, query combinations and associated information values IV may be calculated by replacing each replica database with its corresponding remote database in each of a plurality of successive query plans. For example, first using R4' as referenced above in the context of the ordered replica databases, a first query plan may be stated as R4' R1' R2' R3', so that for x=13, y=2; IV=BV*0.9^(13+2). In this case, a second boundary b 608 in FIG. 6 may be set as b=11+15=26. In a next query plan, R4' is replaced with T4 resulting in a query plan of T4 R1' R2' R3', so that for x=10, y=4, IV=BV*0.9^(10+4), and thus a third boundary b 610 is b=11+14=25, as shown in FIG. 6. Then replacing R4' and R1' with T4 and T1, a query play of T4 T1 R2' R3' may be used that for: x=10, y=6, yields boundary b=25 (already shown above), and, similarly replacing R4", R1', and R2' results in T4 T1 T2 R3':, so that for x=11, y=8, a boundary b again equals 25.

Thus, the search space has again been reduced, this time constrained to consider only query plans within the boundary b 610 of timestamp 25. The current time line 602 is still at 11, which has obviously not reached the boundary 25, and so the above process repeats. Specifically, the current time line is pushed to the next synchronization point of R4" at the timeline 604, and the query plan combinations and associated information values may be computed again in the manner just illustrated.

In particular, the new order is based on the next-earliest synchronization point of R1', so that the new order is R1', R2', R3', R4". For x=9 and y=3, this order results in an information value of IV=BV*0.9^(9+3), so that a new boundary b 612 is determined as b=11+12=23. Similar computations may be made for remaining combinations using the new order but progressively replacing each replica database with its corresponding remote database, as described above.

As the boundary line(s) moves backwards and the current time line forwards, the searching space shrinks dramatically. Further, it may be possible to eliminate other possible solutions which may be observed to be necessarily worse than already-considered query plan combinations. For example, the combination {T1, R2', R3', R4'} may be eliminated, since it will not result in a better solution than {R1', R2', R3', R4'}. Such plan eliminations may be useful in further shrinking the search space.

Figure 7:
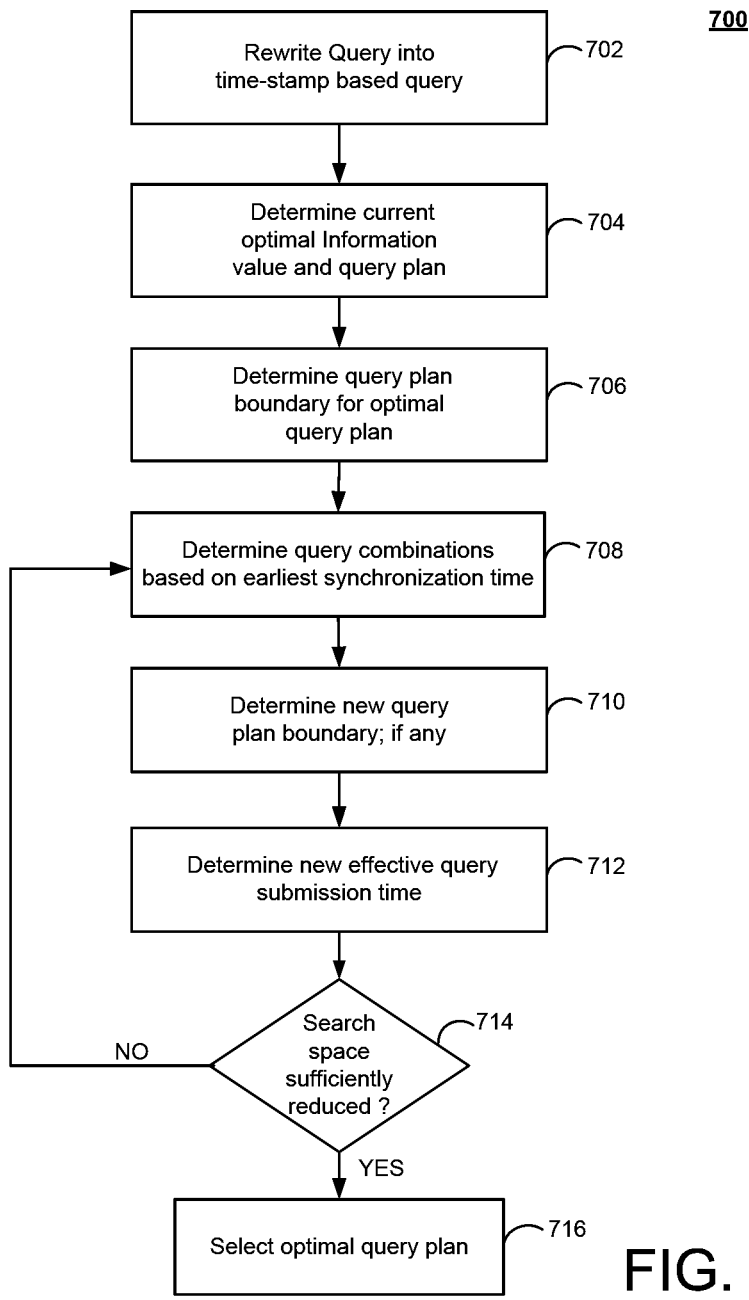
FIG. 7 is a flowchart illustrating example operations of the system of FIG. 1 when selecting a query plan(s) of FIGS. 5 and 6.

FIG. 7 is a flowchart 700 illustrating example operations of the system of FIG. 1 when selecting a query plan(s) of FIGS. 5 and 6. Specifically, in FIG. 7, the query handler 112 may receive the query 104 to be re-written by the query re-writer 118 using an earliest time-stamp of the replica databases, e.g., R1-R4 (702). Then, a current optimal query plan and associated information value may be determined (704). For example, the search space manager 130 may determine the time of query submission, and the information value calculator 122 may determine the current optimal information value, based on a default combination of using only the remote databases T1-T4.

The current optimal IV may be used to determine an outer boundary line, beyond which no query plan combination will be better than the current optimal solution (706), e.g., using the search space manager 130. New query plan combinations may be determined relative to an earliest synchronization time (database) (708), e.g., by the information value calculator 122. Such query plan combinations may be used again by the information value calculator 122 and the search space manager 130 to determine a new (closer) boundary line (710).

Assuming this new boundary line is not all the way back to the query plan submission time, then the next effective query submission time may be determined (712), by the search space manager 130, based on the next synchronization point. If at this time the search space is sufficiently reduced (714), then the remaining combinations (less any unnecessary combinations that are necessarily worse than the current optimal solution) may be computed and an optimal query plan combination may be selected (716), e.g., by the query plan selector 132. Otherwise, the process continues by determining new query plan combinations based on the current earliest synchronization time (708).

The above operations may be executed by the information value calculator 122 and the search space manager 130 using Algorithm 1, as shown below.

Algorithm 1
Algorithm 1 STQP (Query $q_i$)

Figure 8:
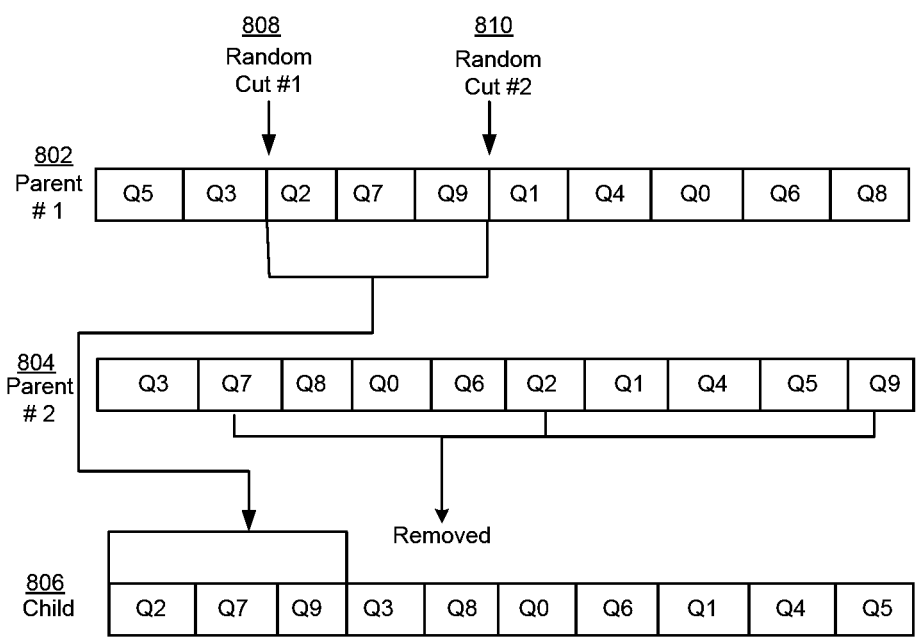
FIG. 8 is a block diagram illustrating an example combination of chromosomes used in the system of FIG. 1 when optimizing a workload of multiple queries.

1: /*Scatter Phase*/
2: opt = BV × $(1- \lambda_{CL})^x$ × $(1- \lambda_{SL})^y$;
3: Boundary = x + y + t; /* t is current time*/
4: /*Gater Phase*/
5: flag=F;
6: for (; t < Boundary; ) do
7:    C.Vary combination order;/*C is the combination candidate set*/
8:    C.Eliminate unnecessary combinations;
9:    if flag= =F then
10:       Boundary = min{C.Boundaryg}; /* boundary backwards */
11:       flag=T;
12:    else
13:       t=t.getnext;/* current time forewords */
14:       flag=F;
15:    end if
16:   end if
17: end for FIG. 8 is a block diagram illustrating an example combination of chromosomes used in the system of FIG. 1 when optimizing a workload of multiple queries. As referenced above, in addition to query optimization for maximizing information values for individual queries, the DSS 102 includes the workload manager 116 that is configured to generate a schedule that maximizes the information value for a whole workload of queries. The workload manager 116 may assist, for example, in situations in which an optimal query plan for one query may conflict with the optimal query plans of other queries. In such a case, the workload manager 116 may optimize the information value for the workload as a whole, instead of just for an individual query.

The multi-query optimization (i.e. scheduling) generally includes operation of the group generator 134 of FIG. 1 to identify possible conflicting queries and forming a workload for multi-query optimization. For example, for each query, the group generator 134 may access the query plans determined by the query plan generator 114, and may derive a range along the time axis that the query may run. If the ranges of more than two queries are overlapped, then the group generator 134 may group them into a workload.

Then, the sequence manager 136 may generate a workload execution sequence and individual plan for each query in the workload, such that an optimal information value for the workload as a whole is achieved. As already described, the sequence manager 136 may implement such a selection process by using a genetic algorithm manager 138. Such a genetic algorithm manager may implement a genetic algorithm as a computer simulation of Darwinian natural selection that iterates through various generations to converge toward the best solution in the problem space. A potential solution to the problem exists as a chromosome, which, as shown in FIG. 8, here may be represented as an execution sequence for the workload for achieving maximal overall information value.

In FIG. 8, a parent chromosome 802 is illustrated with a second parent chromosome 804, which are then combined to obtain a child chromosome 806. Each chromosome represents an execution order for the workload of queries. As shown, the parent chromosome 802 includes a sequence of Q5, Q3, Q2, Q7, Q9, Q1, Q4, Q0, Q6, and Q8. The parent chromosome 804 includes a sequence of Q3, Q7, Q8, Q0, Q6, Q, Q1, Q4, Q5, and Q9.

Figure 9:
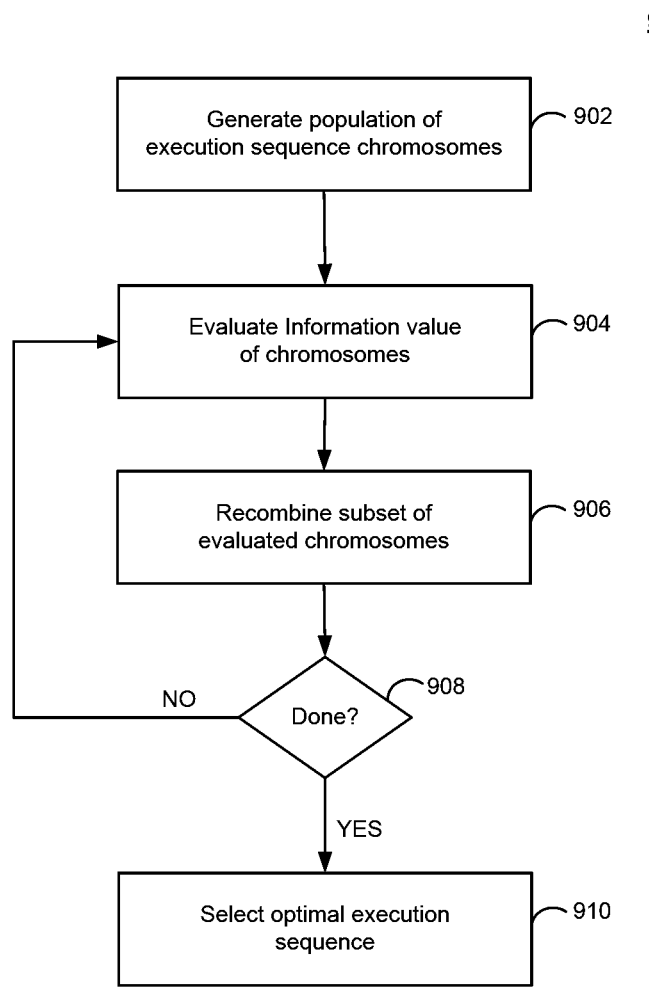
FIG. 9 is a flowchart illustrating example operations of the system of FIG. 1 when optimizing a workload of multiple queries as in FIG. 8.

FIG. 9 is a flowchart 900 illustrating example operations of the system of FIG. 1 when optimizing a workload of multiple queries as in FIG. 8. In particular, and as referenced above with respect to FIG. 1, the genetic algorithm manager 138 may begin with a random set of chromosomes used to form a first generation (902), such as may include the parent chromosomes 802, 804. Then, this population may be evaluated (904), e.g., by the chromosome evaluator 140. For example, the chromosome evaluator 140 may use combined information values of the workload of each chromosome and then rank these for selection of a most-desired subset.

Then, the selected subset may be broken into pairs, such as the pairs 802, 804, to be recombined into parents of the subsequent generation (906), e.g., by the chromosome combiner 142. Such recombination produces children in a manner that simulates sexual crossover, so that, e.g., mutations may occasionally arise which were not present in the previous generation.

In the example of FIG. 8, as shown, the parent chromosomes 802, 804 may be combined into the child chromosome 806 using a random cut 808 and a random cut 810 for the parent chromosome 802, which provides a slice of sequences (including Q2, Q7, Q9) to be included at the beginning of the child chromosome 806, as shown. Then, the rest of the child chromosome may be completed by disregarding the queries Q2, Q7, Q9 of the slice within the other parent chromosome 804, as shown, and then including remaining queries Q3, Q8, Q0, Q6, Q1, Q4, and Q5 within the remainder of the child chromosome 806. As may be appreciated, many other techniques may be used to execute the re-combinations.

If the genetic algorithm is done (908), then the optimal workload sequence may be selected (910). In this sense, it may be appreciated that a number of factors or metrics may be used to determine whether the genetic algorithm is finished. For example, the genetic algorithm manager 138 may be configured to execute the genetic algorithm for a certain amount of time, or for a certain number of generations. In other situations, an external factor may be received which effectively ends the iterations of the genetic algorithm manager 138, such as, e.g., information that a deadline is imminent which forces the end of the iterations. If the genetic algorithm is not done (908), then the process may continue with evaluation of the new generation of chromosomes (904), so as to select the next set of parent chromosomes for recombination of pairs thereof (906).

Algorithm 2 illustrates operations of the genetic algorithm manager 138 as described above with respect to FIGS. 1, 8, and 9. In the Algorithm, the variable t represents the current generation and P(t) represents the population at that generation.

Algorithm 2
Algorithm 2 Procedure Genetic Algorithm

```
1: t = 0;
2: initialize P(t);
3: for ( ;! done; ) do
4:     alter P(t); /* recombine/mutate */
5:     t = t + 1;
6:     select P(t) from P(t − 1);
7:     evaluate P(t);
8: end for
```

Figure 10:
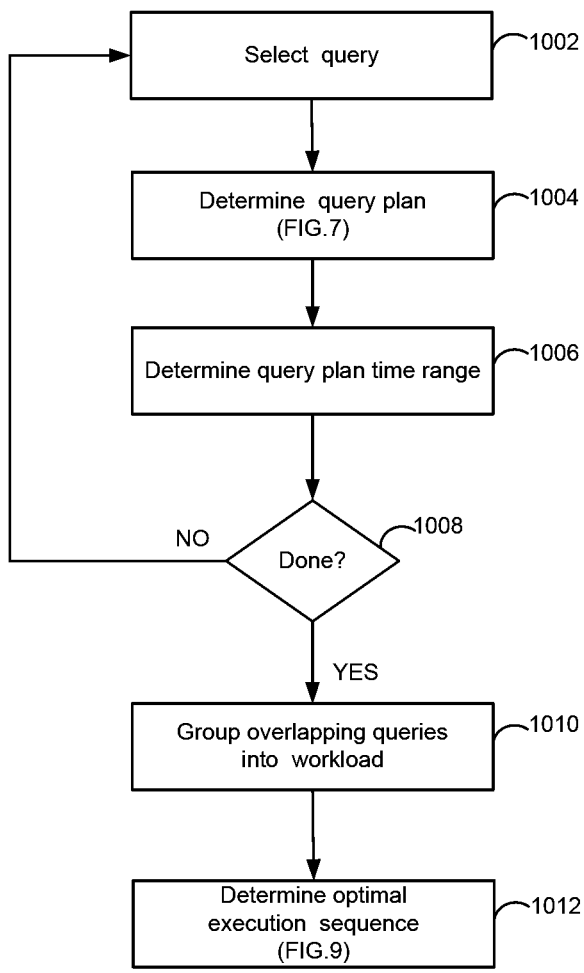
FIG. 10 is a flowchart illustrating example operations of the system of FIG. 1 including the operations of FIG. 7 and FIG. 9 as sub-operations thereof.

FIG. 10 is a flowchart 1000 illustrating example operations of the system of FIG. 1 including the operations of FIG. 7 and FIG. 9 as sub-operations thereof. In FIG. 10, a query is selected (1002) for processing, e.g., by the query handler 112. Then, a query plan which optimizes the information value of the query may be determined (1004), e.g., using the operations of FIG. 7. A plan time range may be determined (1006), e.g., by the group generator 134, for the query and associated query plan.

If another query is available (1008), the operations continue (1002-1006) until no more queries are available or until it is determined that no more queries of available queries may possible overlap with existing/processed queries. At such time, overlapping queries may be determined and grouped into a workload (1010), e.g., by the group generator 134. Then, an optimal execution sequence may be determined (1012), using the operations of FIG. 9.

FIGS. 1-10 and associated description, above, describe and illustrate many different implementations of the DSS 102. Of course, such implementations are merely for the sake of example, and additional or alternative implementations may be used, as well.

For example, the description above provides discussion of pre-registered query workload(s) running periodically in fixed intervals. However, the DSS 102 also may process online arrival ad hoc queries.

In particular, there may be at least two types of online arrival ad hoc queries, e.g., those which arrive for immediate execution, and those which arrive for scheduled execution at a later time, both of which may be handled according to the following.

For ad hoc queries submitted, a query plan selection task is executed and a range is derived along the time axis over which the query may run. If the ranges of more than two queries are overlapped, they may be grouped into a workload as described above. Possible execution plans of all queries may be registered, and when a new ad hoc query arrives, the possible execution range of the new queries may be compared with the ranges of possible execution plans of the registered queries (i.e., instead of ranges of selected plans of the registered queries.) Then, possible conflicting queries may be selected and formed into a new workload group for multi-query optimization.

Then, a workload execution sequence and individual plan may be regenerated for each query in the workload. If conflicting queries are being processed, then running queries may be processed by, e.g., canceling the running queries and regenerating new plans with the new workload group, letting the running queries continue to complete as scheduled, or suspending the running queries and rescheduling the remaining of the query processing steps with the new workload group. In this latter case, all suspended queries may use the same query plans after they are resumed.

The DSS 102 also may be configured to deal with possible starvation scenarios of processing queries and query plans. In this context, starvation refers to the recognition that Eq. (1) for determining the information value favors immediate query execution to avoid decay or diminishment of the business/query value. Thus, it may occur that a query which is queued may continue to be queued essentially indefinitely, since such a query may continually be superseded by new queries with a higher information value. Such starvation may occur in particular when the system 100 is heavily loaded. Such starvation does not impact the achieving an overall optimal information value, but may nonetheless cause dissatisfied users who are required to wait indefinitely for their desired information.

Therefore, as one example way to prevent such starvation, Eq. (1) for calculating information value IV may be adapted to include a function of time values to increase the information value of queries that are queued for a period. Such a function of time value is designed to increase information value faster than the information value would be discounted by SL and CL, in order to advance the query within the queue.

Algorithm 3 illustrates an example algorithm for implementing the operations of FIG. 10, including the just-described considerations of ad hoc online arriving queries and the starvation problem.

---
Algorithm 3
Algorithm 3 Query Processing (Query Q[$q_1$ ... $q_n$], Ad hoc Query AQ[aq1..$aq_n$])

```
 1: for Each query q_i ∈ Q do
 2:     P=STQP(q_i); /*Find qi's plan & time range*/
 3: end for
 4: W[1].enqueue(q_1);
 5: W[1].t = q_1.t;
 6: k = 1;
 7: flag=F; /* W is the overlapped query workload*/
 8: for Each i ∈ 2 [2, n] do
 9:     for Each x 2 ∈ [1, k] do
10:         if q_i.t ∩ W[x].t ≠ 0 then
11:             flag = T;/* Have overlap*/
12:             break;
13:         end if
14:     end for
15:     if flag= =F then
16:         k++; /* no overlap found, open a new group*/
17:     end if
18:     W[x].enqueue (q_i);
19:     W[x].t.update;
20:     flag=F;/* Update to a bigger range*/
21: end for
22: for Each i ∈ [1, k] do
23:     Best_Order[i]= MQO(f(t)W[i]); /* Reference Procedure
         genetic algorithm, function f(t) is used to avoid
         starvation problem*/
24: end for
25: if AQ.size!=0 then
26:     for Each aq_i ∈ AQ do
27:         P=STQP(aq_i);
28:         for Each j ∈ [1, k] do
29:             if aq_i.t ∩ W[j].t ≠ = 0 then
30:                 W[j].equeue(aq_i);
31:             end if
32:         end for
33:         if W[j].status=run then
34:             Cancel the running query; OR
35:             Let running query continue to complete as scheduled;OR
36:             suspending the running query;
37:             Best_Order[j] = MQO(f(t)W[j]);/* Reschedule*/
38:         end if
39:     end for
40: end if
```
---

In Algorithm 3, as may be seen, for each pre-registered query, Algorithm 1 (referred to as Algorithm STQP in Algorithm 3) to select a plan and derive a time range that the query may run, as shown in lines 1-3). Then, the overlapped queries are grouped into a workload W, as shown in lines 4-21. Using a generic algorithm as described above, an optimal workload execution order may be obtained, in which, in order to prevent the starvation problem described above, a time valued function is used to increase the information value of any long-queued queries, as shown in lines 22-24). If ad hoc queries arrive, a plan and time range may be chosen using Algorithm 1 (referred to again as Algorithm STQP) for each ad hoc query. Then, the workload may be determined that the ad hoc queries belong to (Line 26-32). In each workload, the plans may be re-examined. Three policies can be used once the conflicting queries are already being processed, as shown in lines 33-38).

As described above, when periodically synchronizing one or more databases (and replications thereof), it is possible to increase the Information Value (IV) (as shown in Eq. (1)) of one or more queries applied against the databases and/or replicated databases, by selecting a query plan which defines a subset of the databases and/or replicated databases against which the one or more queries will be applied. As described in detail below, in additional or alternative implementations, it is possible to optimize the IV for at least one query and associated response(s) by modifying or controlling a timing of the synchronization of each replica database with its corresponding remote database.

Figure 11:
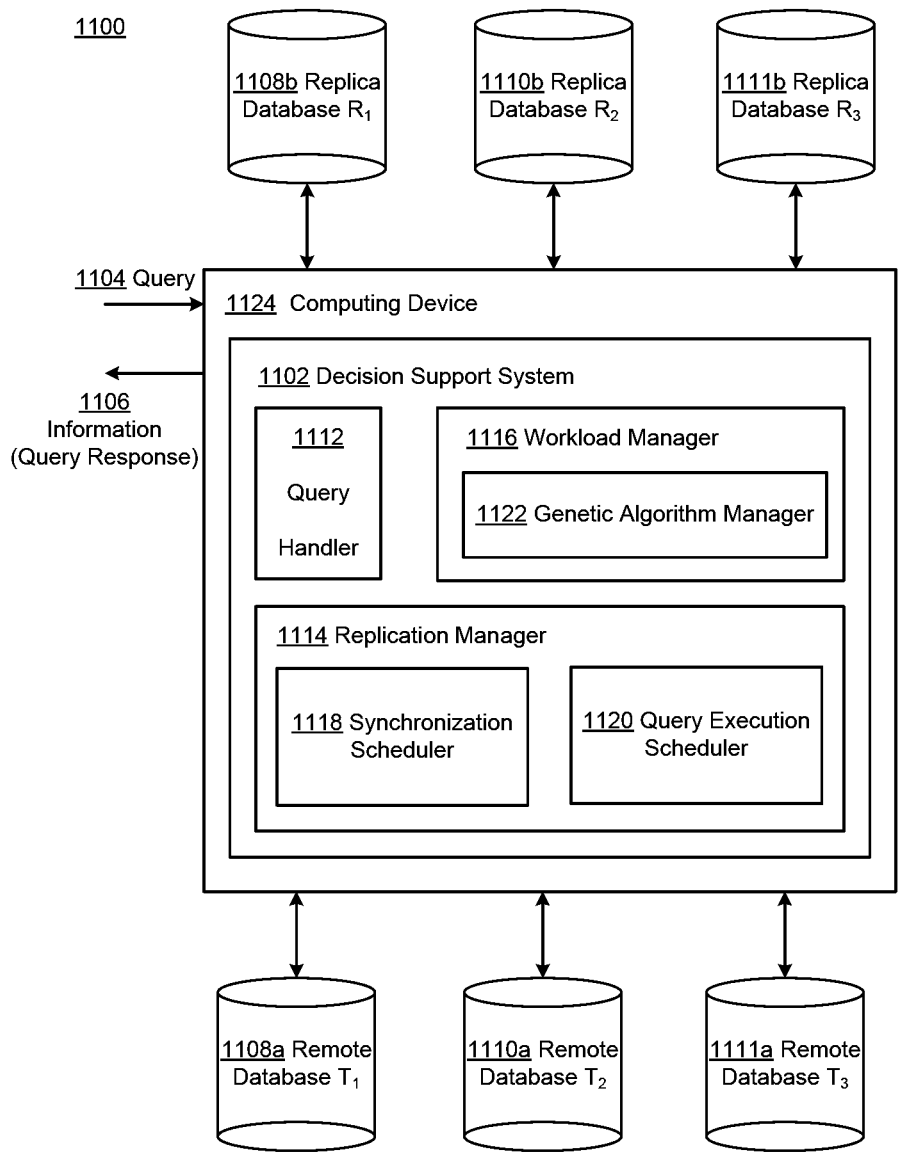
FIG. 11 is a block diagram of an alternative implementation of an information-value driven decision support system.

For example, FIG. 11 is a block diagram of an alternative implementation of an information-value driven decision support system 1102, in which the DSS 1102 receives at least one query 1104 and provides information 1106 in the form of a query response(s) having an optimized information value. More particularly, as described in detail above, the DSS 1102 may have access to remote databases 1108a, 1110a, and 1111a, which may have corresponding local replicas 1108b, 1110b, and 1111b, as shown and analogously as described above with respect to FIG. 1 and databases 108a, 108b, 110a, 110b. Further in the DSS 1102, a query handler 1112 operates in an analogous manner as described above with respect to the query handler 112 of FIG. 1, except as described otherwise herein.

In operation, a replication manager 1114 may be configured to execute synchronizations of the replica databases 1108b, 1110b, and 1111b, with their respective remote databases 11108a, 1110a, and 1111a. In other words, the replication manager 1114 controls a freshness of the data within each of the replica databases 1108b, 1110b, and 1111b, which therefore dictates a synchronization latency (SL) of an Information Value of the query response 1106, as described in detail, above.

In general, in this regard, it may be appreciated that the replication manager 1114 may synchronize each of the replica databases 1108b, 1110b, and 1111b independently of one another, so that corresponding synchronization timestamps may be different than one another. For example, the replica database 1108b may have been synchronized some time ago, while the replica database 1110b may have been just recently synchronized. Consequently, if the query 1104 is applied against the replica database 1108b, the query response 1106 may be associated with a relatively large synchronization latency and a correspondingly lowered Information Value (all other factors being equal), as compared to application of the query 1104 against the more-recently synchronized replica database 1110b. If the query 1104 is applied against both the replica databases 1108b, 1110b, then an overall synchronization latency of the query response 1106 may potentially be reduced by updating (synchronizing) the replica database 1108b to a more recent synchronization timestamp.

Thus, as may be generally observed, and as described in more detail below, it is possible to execute synchronizations of one or more replica databases 1108b, 1110b, and 1111b, in a manner which optimizes an information value of the query response 1106 for at least one query 1104. More specifically, a synchronization scheduler 1118 may be configured to select, for the at least one query 1104, one or more of the replica databases 1108b, 1110b, and 1111b, and to determine whether and to what extent any or all of the replica databases 1108b, 1110b, 1111b should be updated for use in obtaining the query response 1106.

In some implementations, it may be assumed that the query 1104 is a single query which arrives at periodic and/or pre-defined intervals. In such implementations, the synchronization scheduler 1114 may select a synchronization timestamp for all selected/involved replica databases 1108b, 1110b, 1111b, which is selected so as to maximize an Information Value of the resulting query response 1106 (e.g., by minimizing the associated synchronization latency, while nonetheless ensuring that the synchronization(s) may complete prior to arrival and subsequent execution of the query 1104). Examples of such implementations are described below with respect to FIGS. 13-15.

In other example implementations, in addition to selecting an appropriate synchronization timestamp(s), an arrival and/or execution time of the query 1104 may be adjusted so as to further optimize/maximize the Information Value of the query response 1106. For example, as just referenced, the synchronization scheduler 1118 may be configured to minimize an associated synchronization latency, while nonetheless ensuring that the synchronization(s) may complete prior to arrival and subsequent execution of the query 1104. If the query arrival time may be adjusted (e.g., delayed), then the synchronization latency may be further minimized (i.e., a more recent synchronization timestamp may be selected). In this case, a computation latency of the query 1104 may be increased (since, by definition of computation latency as set forth above, a time between actual arrival and completion of the query 1104 would be lengthened). However, such an increase in computational latency may be more than offset by the associated decrease in synchronization latency, so that the Information Value as a whole may be increased according to Eq. (1). Specific examples of such implementations are provided in more detail, below, with respect to FIG. 13, FIGS. 16A, 16B, and FIG. 17.

In some cases, the query 1104 may represent a plurality of separate queries (e.g., at least two queries). Such a plurality of queries may nonetheless need to be applied against common ones of the replica databases 1108b, 1110b, and/or 1111b. For example, a first query may be applicable against the replica databases 1108b and 1110b, while a second query may be applicable against replica databases 1110b and 1111b. If the two queries are in temporal proximity to one another, then synchronizing the replica databases for one of the two queries may be sub-optimal for the other of the two queries.

Consequently, a workload manager 1116 may be configured to cluster groups of queries 1104 and to maximize an Information Value of the cluster as a whole. More specifically, for example, a genetic algorithm manager 1122 may be included which is configured to execute a genetic algorithm to select characteristics for executing a particular cluster of queries. General discussion of the use of a genetic algorithm is provided above, and specific examples of the genetic algorithm manager 1122 of the workload manager 1116 are provided below with respect to FIGS. 13, 18A-18D, 19A-19B, and 20.

In FIG. 11, the DSS 1102 is illustrated as executing on a computing device 1124, which, as described above with respect to the computing device 104 of FIG. 1, may represent one or more computing devices, any of which may be used to implement one or more of the components of the DSS 1102. For example, as referenced above, the computing device 1124 may represent a server that is used to execute a data management system which combines warehousing of data in local replica databases 1108b, 1110b, 111b, along with distribution of queries as-needed to remote databases 1108a, 1110a, 111a. The computing device 1124 may thus be understood to include various standard components associated with standard function of a decision support system, including components for, e.g., replicating data, transmitting queries and receiving information (data) in return. The computing device 1124 may be understood to further include standard components of one or more database management system(s) which may be used to execute operations (e.g., queries) using the various databases. These and other standard components are not illustrated in FIG. 11 explicitly for the sake of clarity and conciseness. Similarly, various ones of the components of the DSS 102 of FIG. 1 may be included, as needed or desired, in the DSS 1102 of FIG. 11.

Figure 12:
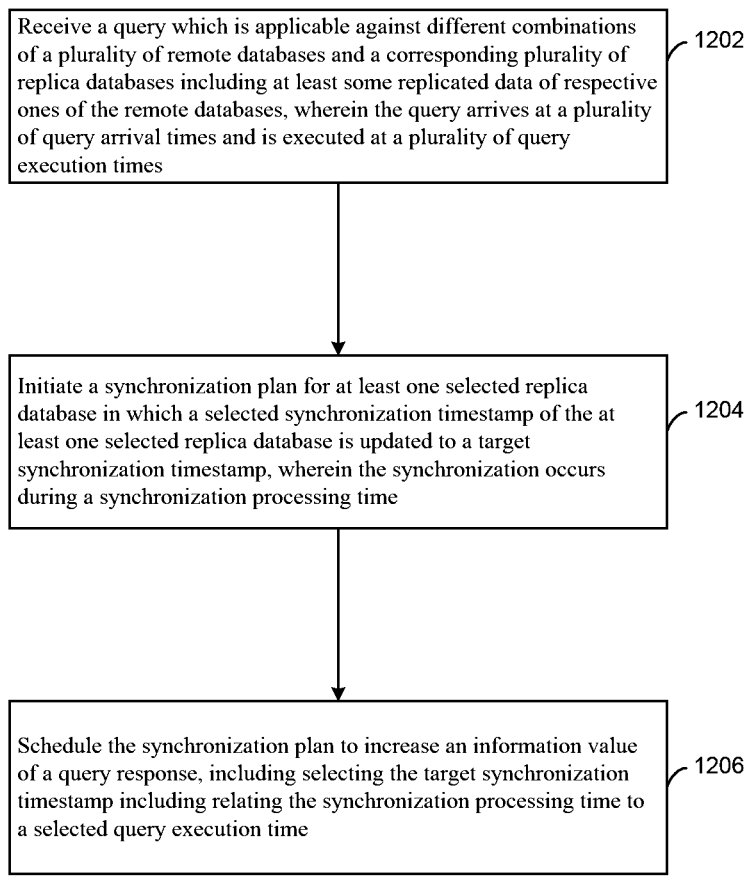
FIG. 12 is a flowchart illustrating example operations of the system of FIG. 1.

FIG. 12 is a flowchart 1200 illustrating example operations of the system 1100 of FIG. 11. In the example of FIG. 12, as with the flowchart of FIG. 2 and other flowcharts described herein, operations 1202, 1204, 1206 are illustrated as sequential operations, but may be appreciated as representing that the various operations 1202, 1204, 1206 may overlap, or occur in parallel, or (except where specified otherwise) may occur in a different order.

In the example of FIG. 12, a query may be received which is applicable against different combinations of a plurality of remote databases and a corresponding plurality of replica databases including at least some replicated data of respective ones of the remote databases, wherein the query may arrive at a plurality of query arrival times and be executed at a plurality of query execution times (1202). For example, as described above, the (at least one) query 1104 may be received by the query handler 1112 and be applicable against the replica databases 1108b, 1110b, and 111b. It may be appreciated that the at least one query 1104 may also be applicable against the remote databases 1108a, 1110a, and 1111a (and that there may be many more remote databases and corresponding replica databases). As referenced above and described/illustrated below in detail (e.g., with respect to FIG. 13), the query 1104 may arrive at a plurality of query arrival times, and may thereafter begin immediate execution or may be queued for delayed execution.

A synchronization plan may be initiated for at least one selected replica database in which a selected synchronization timestamp of the at least one selected replica database is updated to a target synchronization timestamp, wherein the synchronization occurs during a synchronization processing time (1204). For example, the replication manager 1114 may determine that all three of the replica databases 1108b, 1110b, and 1111b of FIG. 11 will be involved in processing the query 1104, and that these replica databases may have a range of previous synchronizations which may already have occurred (e.g., each replica database may have a same or different level of data freshness and corresponding synchronization timestamp(s)). The replication manager 1114 may be configured to update/synchronize a given replica database at a rate which depends, e.g., on a number of records to be updated, a processing speed of the computing device 1124, a length of time since a previous synchronization, and/or other factors. Consequently, as explained and illustrated in detail below, e.g., with respect to FIG. 13, the replication manager 1114 may use an amount of synchronization processing time required to advance each replica database from its current synchronization timestamp to a desired target synchronization timestamp associated with an optimized Information Value for the query 1104.

Then, the synchronization plan may be scheduled to increase an information value of a query response, including selecting the target synchronization timestamp including relating the synchronization processing time to a selected query execution time (1206). For example, the synchronization scheduler may determine the target synchronization timestamp for one or more of the replica databases 1108b, 1110b, and 1111b, and may schedule the synchronization plan to start and complete (i.e., to update desired ones of the replica databases 1108b, 1110b, and 1111b to the target synchronization timestamp or level of data freshness) in advance of a query execution time of the query 1104. As described above, it is possible to delay such a query execution time if necessary or desired to complete the synchronization in advance thereof while optimizing the Information Value of the query response 1106.

Figure 13:
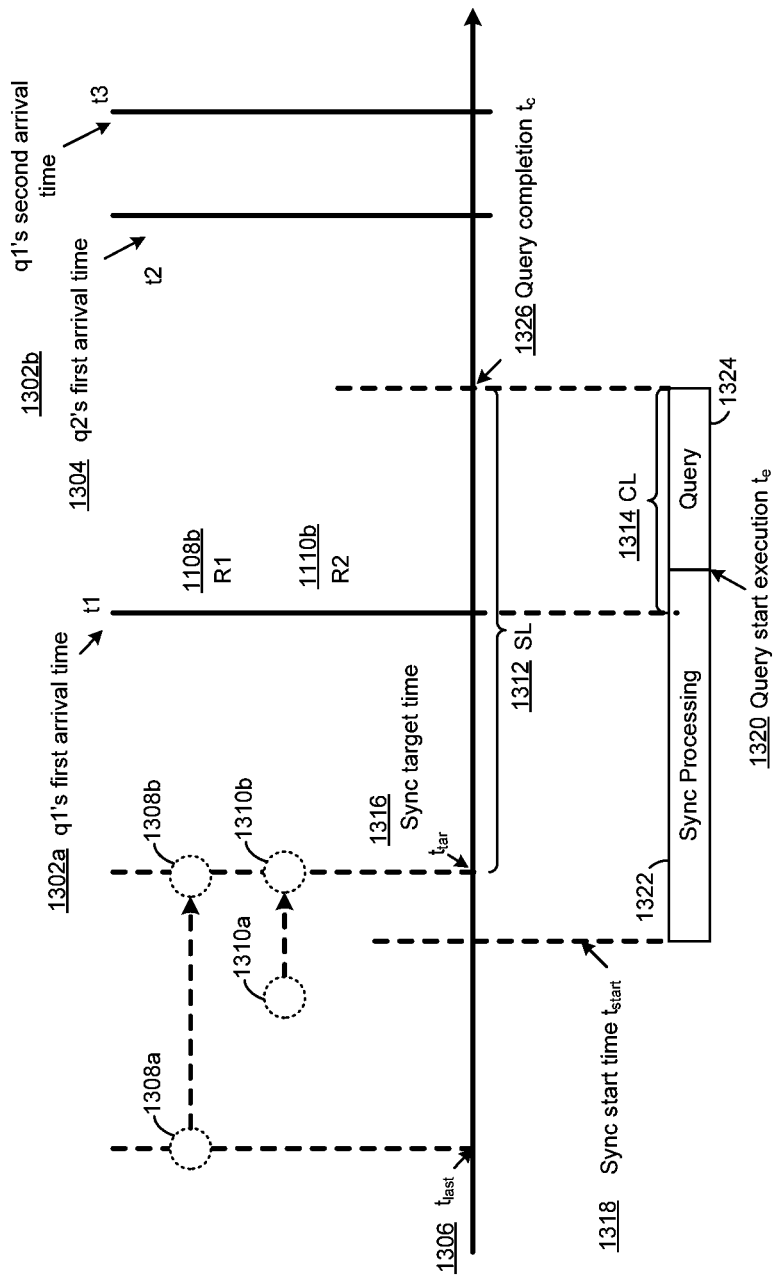
FIG. 13 is a timing diagram illustrating characteristics of the system of FIG. 11.

FIG. 13 is a timing diagram illustrating characteristics of the system of FIG. 11 In the example of FIG. 13, only the replica databases 1108b (R1) and 1110b (R2) are illustrated. In the example, a query q1 (e.g., an example of the query 1104) is shown as arriving at time t1 (1302a) and then again for a second time at time t3 (1302b). Meanwhile, a second query q2 is shown as arriving at a time t2 (1304).

As shown, a time $t_{last}$ 1306 represents an oldest synchronization timestamp; in this case, associated with a synchronized version of the replica database R1 1108b 1308a, as shown. Meanwhile, as also shown, the replica database R2 1110b existed as a synchronized version 1310a having a corresponding synchronization timestamp.

Thus, during an example operation of the DSS 1102, the replication manager 1114 may wish to optimize a synchronization latency SL 1312 associated with processing the query q1. As defined above, and shown in FIG. 13, the SL 1312 refers generally to a time between a synchronization timestamp and a time of query completion $t_c$ 1326. As also described above, and illustrated in FIG. 13, the query q1 is associated with a computational latency CL 1314, which is defined as a time difference between the first arrival time 1302a and the query completion time $t_c$ 1326.

As described, by selecting an appropriate synchronization target time $t_{tar}$ 1316, the DSS 1102 may maximize an Information Value of the query response for the first query q1. For example, the DSS 1102 may minimize SL 1312 to increase the Information Value according to Eq. (1), by selecting a very-recent value for the target synchronization timestamp $t_{tar}$ 1316. In order to obtain the synchronized versions 1308b, 1310b of the respective replica databases 1108b, 1110b, the DSS 1102 may begin updating/synchronizing the replica databases 1108b, 1110b at a synchronization start time $t_{start}$ 1318. As described above, such an updating/synchronizing process may not generally be completed instantaneously, and instead requires a synchronization processing time 1322 to provide sufficient time to update the replica databases 1108b, 1110b to synchronized versions 1308b, 1310b at the synchronization target timestamp 1316.

During the updating/synchronizing processing time 1322, execution of the query q1 may not begin. Instead, as shown, if the processing is ongoing at a query arrival time t1 1302a, then a start time $t_e$ 1320 of the query execution may be delayed until the synchronization processing 1322 has completed and the replica databases 1108b, 1110b are both synchronized to versions 1308b, 1310b at the synchronization target timestamp 1316.

Thus, the DSS 1102 may select a very recent synchronization target time $t_{tar}$ 1316, e.g., including setting $t_{tar}$=t1 as the arrival time of the query q1. In such a case, the SL 1312 may be reduced all the way to zero, and, by itself, a reduction in SL 1312 corresponds to an increase in the Information Value, according to Eq. (1). However, a more recent synchronization target timestamp $t_{tar}$ 1316 implies a lengthier synchronization processing time 1322, so that such processing may not complete until well after the query arrival time t1 of the query q1. In such cases, an execution start time $t_e$ 1320 of the query q1 will be delayed, resulting in an increased value of the CL 1314. Therefore, also according to Eq. (1), an increase in the CL 1314 corresponds to a decrease in the Information Value for the ultimate query response.

From the description and illustration of FIG. 13, it may thus be observed that the DSS 1102 may execute an optimization of the Information Value for the query q1. Specifically, the DSS 1102 may be configured to find a balance or optimization point at which a reduction in the SL 1312 provides an optimized Information Value, even if an associated CL 1314 is increased somewhat in order to reach the optimal value of the SL 1312. In other words, it may occur that the largest Information Value may be obtained by balancing a freshness of the data against a delay (or other adjustment) of a query start time. That is, it may be worthwhile to wait to begin the query execution in order to obtain fresher (more recently synchronized) data.

In addition to optimizing the values of SL 1312 and CL 1314 for the query q1, the DSS 1102 may be configured to consider the presence of the second query q2, and to optimize a composite or aggregated Information Value for both queries q1, q2 which use common one(s) of the replica databases. For example, as described herein, the queries q1, q2 may arrive relatively close to one another in time (e.g., query processing times and/or synchronization processing time may overlap). Optimization of synchronization timestamps for associated replica database(s) used by the first query q1 (and any associated adjustment (e.g., delay) of a query execution start time) may provide an optimized Information Value for the first query q1 as just described.

However, such optimization steps may be sub-optimal or harmful to an Information Value for the query q2. For example, selecting a particular synchronization target time $t_{tar}$ for the first query q1 may cause a synchronization processing time which delays availability of one of the replica databases for use in processing the second query q2. Then, an execution start time for processing of the second query q2 may be undesirably delayed (i.e., CL for the second query q2 may be undesirably increased).

In general, then, it may be appreciated that the workload manager 1116 of the DSS 1102 may be configured to calculate an optimized Information Value for a group of cluster of related queries. For example, as described herein, the genetic algorithm manager 1122 may be configured to determine a number of potential (parent) orderings of such a group or cluster of queries, e.g., based on a query value of the Information Value of Eq. (1), shown therein as a specific example of a Business Value (BV). Then, for each ordering, an overall synchronization plan may be scheduled for the query group, and the genetic algorithm manager 1122 may be configured to determine a next generation of (child) orderings therefrom, so that the genetic algorithm may be repeated for a desired number of generations or for an available/desired amount of time. In this way, an overall Information Value for each query group may be increased. Further examples of the operations of the workload manager 1116 and the genetic algorithm manager 1122 are provided in detail, below, with respect to FIGS. 18A-18D, 19A-19B, and 20.

Figure 14:
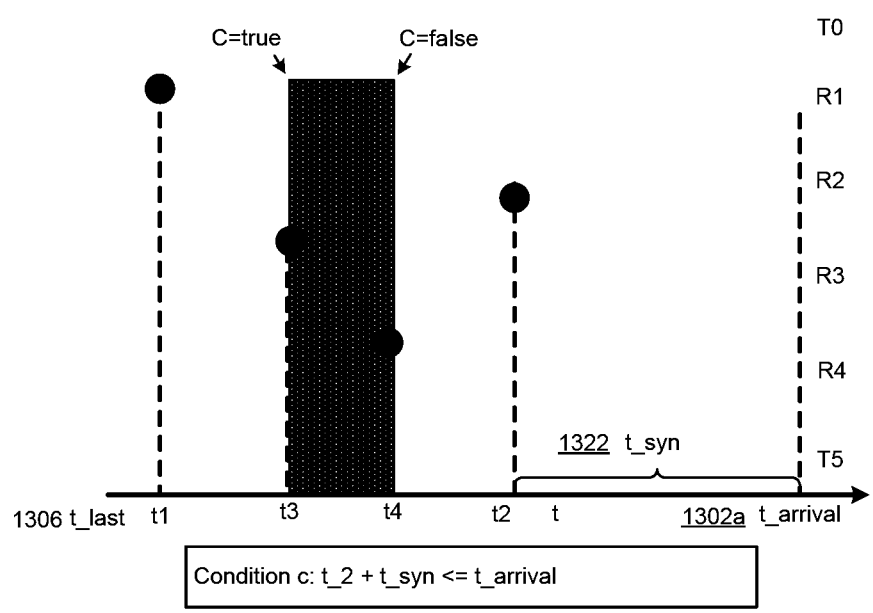
FIG. 14 is a timing diagram illustrating replica synchronization with a fixed query arrival time.

FIG. 14 is a timing diagram illustrating replica synchronization with a fixed query arrival time. That is, as described above, example implementations may assume, or may require, that each query arrival time (in FIG. 3, e.g., t1 and t3 for q1 and t2 for q2) is fixed and non-adjustable. In such a case (in particular, for query arrival time t1 1302 for the first query q1), the synchronization scheduler 1118 may seek to determine a synchronization target time $t_{tar}$ 1316 that is as recent as possible (e.g., as close to the query arrival time t1 as possible), while still ensuring that the synchronization processing time 1322 completes prior to the query arrival at time t1 1302.

Example techniques for achieving this result are described below with respect to FIGS. 14 and 15, and Algorithm 4, below. In the associated description, and with reference to FIG. 1 as well, the following notation is used. Specifically, a query q is said to be evaluated against "n" base tables T= $\{T_0, \ldots, T_{n-1}\}$, with "m" replica databases R=$\{R_0, \ldots, R_{m-1}\}$, where m is less than or equal to n and $R_j$ is a replica of a remote/base table $T_i$. The query 1 arrives at time stamp $t_q$, and the computation cost of the query q is represented as $C_q$. Then, synchronization time stamps of a replica $R_i$ for i between 0 and m−1 for $t_q$ is $t_i = \{t_{i0}, \ldots, t_{ip}\}$. The last synchronization timestamp prior to $t_q$ is represented as $t_{i0}$. Then, synchronizations after $t_q$ begin with $t_{i1}$ and go to $t_{ip}$. Further, $t_i.1^{st}(t)$ is used to denote a last synchronization timestamp for $t_i$ since a current time t.

With these notational definitions, it may be observed that when replica databases are used as described herein, CL and SL may be defined according to Eq. (2):

$$CL = C_q + t_{ij} - tq \quad (j > 0) \qquad \text{Eq. (2)}$$

$$SL = C_q + \max_{w=1, w \neq i}^{m} \{t_{ij} - t_w, lst(t_{ij})\}$$

In the above, a definition of a replica's synchronization time stamps is defined with respect to the query's arrival time. That is, the latest synchronization time stamp before $t_q$ has the id 0, as described above. Then, the SL contains the time from $t_{10}$ until $t_q$. If the query is delayed for execution, the following time stamp $t_{11}, t_{12} \ldots$ are considered to represent a query waiting time (i.e., a time before execution begins which thus increases computation latency CL).

Techniques for selecting a query plan are described in detail with respect to FIGS. 1-10. A simplified technique for selecting a query plan which involves a subset of base tables and replicas may be based on the computation cost. For example, there may be three remote tables T1, T2 and T3 in a replication schema of the DSS 1102, and two replicas R1 and R2 located in the DSS 1102, while T2 and T3 are located in the same node. If a query q is issued over table T1 and T2, it may be better to process q with R1 and R2 because of the low processing cost. However, if q is issued over T2 and T3, R2 may be avoided in order to avoid the associated large communication cost, in which case the DSS 1102 should choose T2 and T3 as the query plan. In the following, it is assumed that a query plan is generated by the DSS using an appropriate mechanism, and that, given that query plan, the DSS 1102 is configured to select time stamps of synchronization for each replica database, and possibly the timestamps of query execution, so as to maximize the Information Value of Eqs. (1) and (2).

With reference again to FIG. 13, it may be observed that the techniques described herein for achieving this result reflect a correlation that exists among replicas' synchronization start time stamp $t_{start}$, synchronization target time stamp $t_{tar}$, and query processing start time stamp $t_q$. Further, synchronization correlation may exist within a query's multiple arrivals. For example, in FIG. 3, t1 and t3 are two arrivals of the same query q1, and the synchronization plan selection for the query processing at t1 may also affect the plan selection for t3. Further, as described, correlation and parallelism may exist among multiple queries.

Continuing with notational definitions for use in describing the included examples, it is assumed that replication may be defined with respect to a rate "r" at which replication occurs, with respect to the time $t_{last}$ which represents a previously most-recent synchronization for a table T (e.g., time 1306 in FIG. 13). Then, replication may be stated as <r, $t_{last}$>, where "r" is defined as $f_r/f_l$, where $f_r$ is the remote data update rate, e.g. 50 records/second, and $f_l$ is the local data update rate which is typically determined by the schema of the table, communication cost(s), and relevant CPU resource(s) of the relevant local node. For example, the replica can be synchronized at the rate of 100 records/second.

Therefore, given the synchronization target time $t_{tar}$, the time for a replica R to synchronize (e.g., synchronization processing time 1322 in FIG. 13) can be computed from Eq. (3):

$$t_{sny}(R, t_{tar}) = \max\{0, r \times (t_{tar} - t_{last})\} \qquad \text{Eq. (3)}$$

In Eq. (3), it may be observed that $t_{syn}(R, t_{tar})$ is 0 if $t_{tar}$ is no bigger than $t_{last}$ (i.e., if the data are fresher than the data at the target synchronization time stamp $t_{tar}$).

With reference to FIG. 14, replicas R1 to R4 are shown as having different last synchronization time stamps (i.e., different $t_{last}$ values t1, t3, t4, t2 corresponding to replica databases R1, R3, R4, R2, respectively). Thus, as described above, at a current time t, the synchronization scheduler 1118 may be configured to select a synchronization target time $t_{tar}$ which may conceivably be located at any place between $t_1$ and t_arrival 1302a. If $t_{tar}$ is in a range of [t2; t], then all the replicas of the tables should be updated. However, if $t_{tar}$ is in [t1; t3], only the replica R1 needs to be updated, and the query result's information freshness is $t_{tar}$. The time to complete the synchronization process is at time stamp t+$t_{syn}$(R1; $t_{tar}$), where $t_{syn}$(R1; $t_{tar}$) is computed from Eq. (3). More generally, the completion time for n replicas is shown in Eq. (4), where $t_{comp}$ represents the end time of the synchronization processing time 1322 $t_{syn}$, and the current time t represents the starting point of the synchronization processing time 1322 $t_{syn}$:

$$t_{comp} = t + \sum_{i=1}^{n} t_{syn}(R_i; t_{tar}) \qquad \text{Eq. (4)}$$

As described above, synchronizations of all the replica tables should be finished before a relevant query's arrival time stamp $t_{arrival}$, which means $t_{comp}$ should be less than or equal to $t_{arrival}$. If $t_{comp} > t_{arrival}$ and (in the assumed example) the query execution time is not adjustable, then the synchronization plan of the current query may be the same as that of the next arrival of the query.

In example implementations, the query only needs to be processed once and the query results may be cached and used by any other queries with the same synchronization plan. With the assumption in this example(s) of immediate, non-adjustable query execution, the computation latency CL is fixed, and the only factor which affects IV is synchronization latency SL, which is determined by the time stamp $t_{tar}$.

Figure 15:
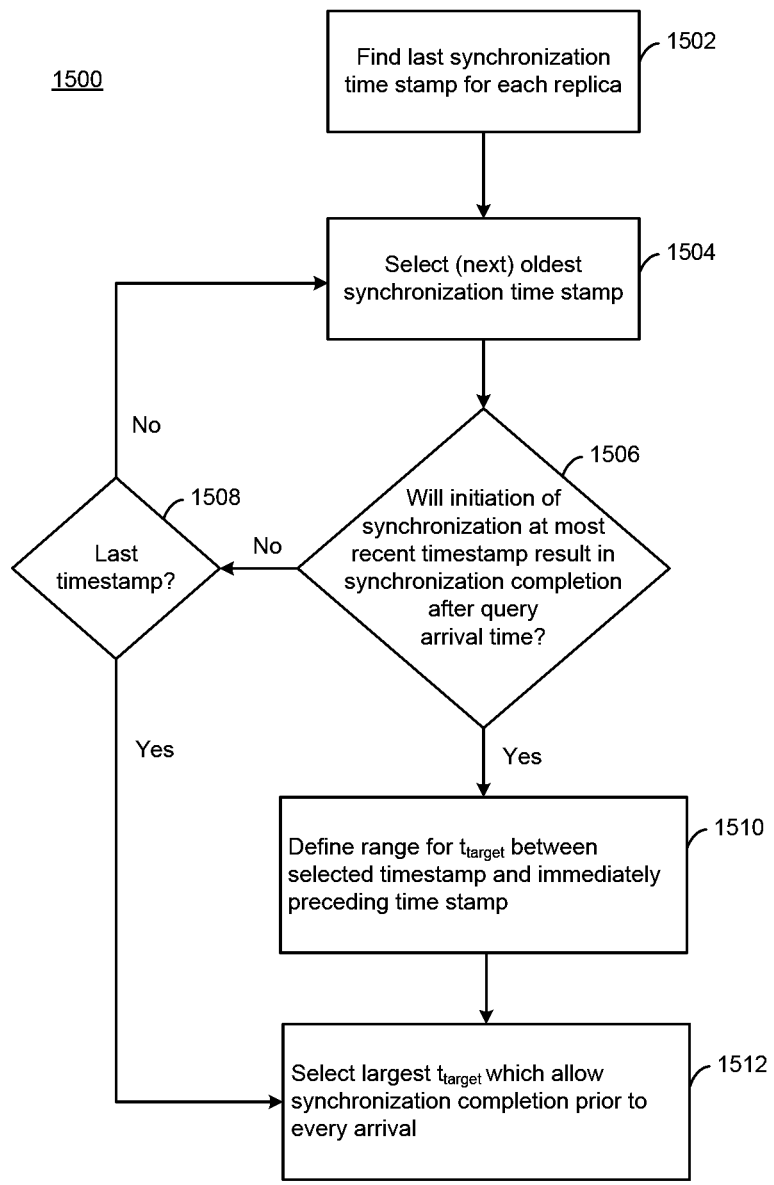
FIG. 15 is a flowchart illustrating operations of the system of FIG. 11 in the context of FIG. 14.

With reference to FIG. 14, FIG. 15 illustrates a flowchart 1500 which provides example operations for selecting a largest (most up-to-date) $t_{tar}$ that still ensures that the synchronization be finished before the query arrival, which implies that the synchronization time $t_{syn}$ should be no bigger than the time interval between $t_{arrival}$ and the synchronization starting time stamp t ($t_{start}$).

In FIG. 15, an array $T_{Last}$ is used to store the last time stamps of all the replicas, sorted in increasing order. As shown in FIG. 14, TLast=[t1; t3; t4; t2]. Therefore, in the example, the largest time interval for synchronization is $t_{arrival} - T_{Last}$[n−1] when t=$T_{Last}$[n−1]. This condition is denoted in FIG. 14 as condition C.

Then, the condition C may be evaluated using the time stamps t1, t3, t4, t2 as boundary conditions, so as to narrow a region in which the synchronization target time $t_{tar}$ might exist. Of course, this is just an example, and other techniques may be used to identify $t_{tar}$ to greater or lesser degrees of accuracy, and in greater or lesser amounts of time.

In the example of FIGS. 14-15, then, $t_{tar}$ may be found by finding a possible time range, represented in FIG. 14 by the hatched area between t3 and t4, by testing the condition C for $t_{tar}=T_{Last}[i]$. Then, a more exact value for $t_{tar}$ may be found by finding the laget $t_{tar}$ within the time range with $t=T_{Last}[n-1]$.

In more detail, in FIG. 15, a last synchronization time stamp is found for each replica (1502). For example, the replication manager 1114 may find t1, t3, t4, and t2 for replicas R1, R3, R4, and R2, respectively, and construct the array $T_{Last}$ as described above.

Then, in an initial iteration, an oldest timestamp may be selected (1504). For example, the synchronization scheduler 1118 may select t1 as the oldest synchronization time stamp. However, as the oldest time stamp, no further synchronization would be necessary, so that the replication manager 1114 may effectively begin with the next oldest time stamp, t3.

It may then be determined whether initiation of a synchronization at the selected timestamp will result in synchronization completion after the query arrival time (1506). For example, the synchronization scheduler 1118 may determine whether updating t1 to t3 will correspond to a synchronization processing time $t_{syn}$ which causes synchronization completion to occur after the query arrival time.

If not, and if the selected timestamp is not the last/most recent time stamp (1508), then a subsequent time stamp may be selected (1504). For example, the synchronization scheduler 1118 may select the next time stamp t4, and then proceed again to test whether the condition C is true or false at that time stamp.

If condition C is true for the time stamp t3 and false for the time stamp t4, as shown in FIG. 14, then a range for $t_{tar}$ may be defined between the selected time stamp (e.g., t4) and the immediately-preceding time stamp (e.g., t3) (1510). Then, a largest $t_{tar}$ within that range which still allows synchronization completion prior to query arrival may be selected (1512) by the synchronization scheduler 1118.

Somewhat similarly, if the selected timestamp meets the condition C and is the last time stamp (1508), e.g., if the condition C is true at time stamp t2, then a largest $t_{tar}$ after t2 and before current time t may be selected which still allows synchronization completion prior to query arrival may be selected (1512) by the synchronization scheduler 1118. Additionally, or alternatively, $t_{tar}$ may simply be selected as the last time stamp, e.g., t2.

Algorithm 4 illustrates an example implementation consistent with the examples of FIGS. 14 and 15.

---

Algorithm 4: Immediate Query Execution

Input: Replica List $R = \{R_0, R_1 \ldots R_{n-1}\}$, replicas' last sync time TLast[ ], Query's next arrival time $t_{arrival}$;
Output: Sync target $t_{tar}$, sync start time $t_{start}$;
{compute $t_{tar}$ range}:
1: for i = 1 to n − 1 do
2:     $t_{sum}$=0;
3:     for j = 0 to i − 1 do
4:         $t_{sum}$+ = $t_{syn}$ (Rj,TLast[i]);
5:     end for
6:     if $t_{sum}$ > $t_{arrival}$ − TLast[n − 1] then
7:         Break; // i is the back boundary of the range;
8:     end if
9: end for

---

Algorithm 4: Immediate Query Execution

10: {compute $t_{tar}$}:
11: $t_{tar}$ = ($t_{arrival}$−TLast[n −1]+ $\Sigma_{j=0}^{i-1}$ ($r_i$TLast[j])) / $ir_i$);
12: if i ≠ n then
13:     $t_q$ =TLast[n − 1]; //$t_{tar}$<TLast[n − 1];
14: else
15:     $t_q$ = $t_{tar}$; //$t_{tar}$ is larger than any $t_{last}$;
16: End if

---

Figure 16A:
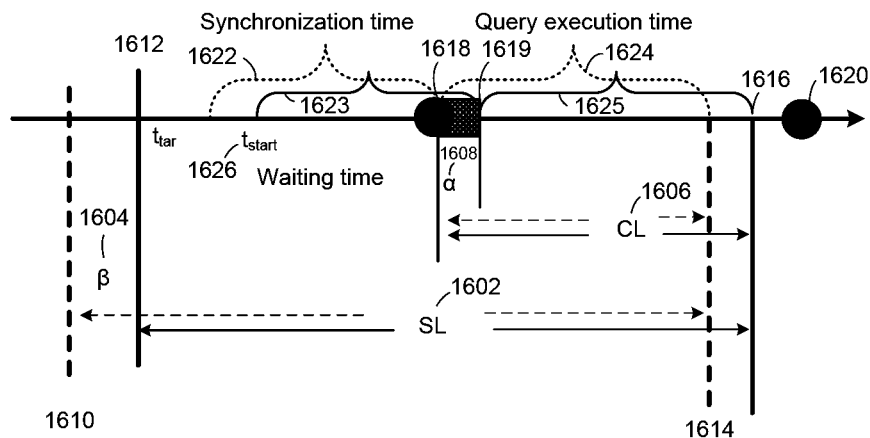
FIGS. 16A, 16B are timing diagrams illustrating replica synchronization with an adjustable query arrival time.
Figure 16B:
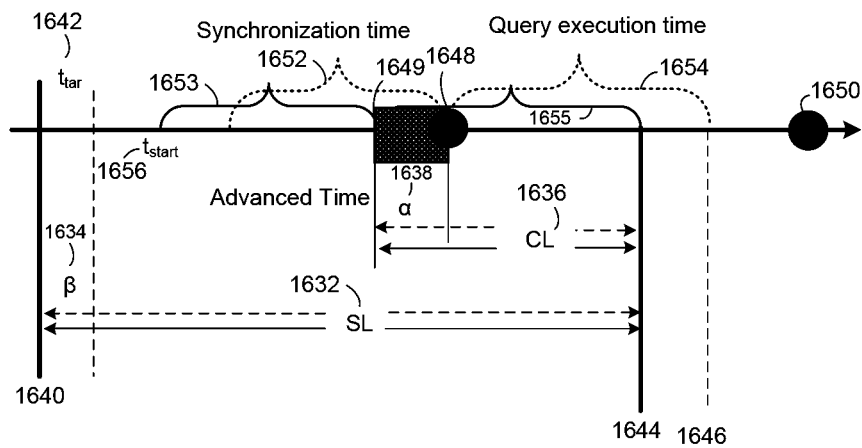

FIGS. 16A, 16B are timing diagrams illustrating replica synchronization with an adjustable query arrival time. For example, as described above, it may be preferable in example scenarios to allow for an increase in CL if such an increase in more than offset by an associated decrease in SL (i.e., to delay query execution in order to ultimately execute the query with fresher data than would otherwise be available). In this way, the associated query Information Value may be further increased.

With reference to FIG. 16A, and using the terminology from above, then, SL 1602 may be decreased by selecting a relatively more updated (larger) $t_{tar}$ than would otherwise be selected if the query execution start time were not adjustable. Thus, as shown, a first $t_{tar}$ 1610 may be increased to a second $t_{tar}$ 1612. As a matter of notation, a difference between the values 1610 and 1612 is represented herein as a variable β 1604, as shown.

Similarly, CL 1606 may be increased by waiting from an original query arrival/start time 1618 to an updated or delayed query execution time 1619. As a matter of notation, a difference between the values 1618 and 1619 s represented herein as a variable a 1608, as shown.

Then, the query start time goes from 1618 to 1619, so that a synchronization processing time goes from 1622 to 1623 (and associated start time $t_{start}$ 1626), and a query execution time is shifted from 1624 to 1625 so as to complete at time 1616 instead of 1614, as shown.

Therefore, using the above notation, it may be seen that the query execution scheduler 1120 may be configured to find values for α, β which are associated with a maximum Information Value for the query in question. Under the above assumptions, CL is increased by α and SL is increased by α and decreased by β. Therefore, Eq. (5) expresses a desired result/increase for the Information Value of Eq. (1), in which the query waits for execution after the synchronization process is finished:

$$BV(1-\lambda_{CL})^{CL}(1-\lambda_{SL})^{SL} < BV(1-\lambda_{CL})^{CL+a}(1-\lambda_{SL})^{SL+a-\beta} \qquad \text{Eq. (5)}$$

Eq. (6) represents a value for α that satisfies this condition. It may be noted that the time α may be assumed to be less than the time interval between consecutive arrivals of each query (otherwise the second arrival 1620 may be used).

$$\alpha < \beta \log_{(1-\lambda_{CL})(1-\lambda_{SL})}(1-\lambda_{SL}) \qquad \text{Eq. (6)}$$

As described above with respect to FIGS. 14 and 15, changes in possible value for $t_{tar}$ occur every time a new $t_{last}$ is tested, so that the value β exists therebetween. For example, in FIG. 14, if the value t3 is tested as a possible $t_{tar}$ and then the value t4 is similarly tested thereafter, then t4-t3 represents a possible value of β. Then, the value α may be calculated as a function of β, according to Eq. (6). More generally, any difference between possible $t_{tar}$ values may similarly be used to calculate α, so that Information Value IV may be calculated as a function of α, or IV=f(α). Then, the best value for a may be selected to obtain a maximized IV. Then, a synchronization plan may be selected with a delayed or immediate query execution by using the highest IV in Eq. (5) under the constraint of α with the relationship of α and β from Algorithm 4 and FIGS. 14/15, above.

As further shown in FIG. 16B, it is also possible to advance (rather than delay) an execution start of a query. That is, in the immediate and delayed plans of FIGS. 14/15 and 16A, it is assumed that parameters of the query are only available after the arrival of the query. However, in some cases, queries are predefined, and users wish to check the query result at each scheduled query execution time stamp. In such scenarios, the DSS 1102 may advance the query execution time to return the results earlier and with better information value.

Thus, in FIG. 16B, a query start time for a query having arrivals 1648, 1650 may be advanced for the first query arrival 1648 from time 1648 to 1649, as shown. Then, synchronization time 1652 may be advanced to synchronization time 1653 having start time $t_{start}$ 1656, while query execution time 1654 advances to query execution time 1655 (beginning at time 1649, associated with a change in query completion ntime from 1646 to 1644, as shown). This results in a value α 1638 associated with a decrease in CL 1636 and a decrease in β 1634 from time 1642 to time 1640 associated with SL 1632.

In the example of FIG. 16B, then, α and β are negative, and an analogous equation to Eq. (6) above may be used to express a in terms of β:

$$|\alpha| > |\beta| \log_{(1-\lambda_{CL})(1-\lambda_{SL})}(1-\lambda_{SL}) \quad \text{Eq. (7)}$$

In general, then, it may be observed that to compute the information value of delayed or advanced query execution plans, appropriate values of α and β should be directly or indirectly determined. For example, the query execution scheduler 1112 may be configured to calculate a relationship between α and β. Specifically, for example, with reference to FIG. 14, a synchronization step may be defined as any synchronization from one time stamp to the next consecutive time stamp, e.g., from t1 to t3, from t3 to t4, or from t4 to t2 (more generally, from $T_{Last}[i]$ to $T_{Last}[i-1]$). When executing the synchronization step from t1 to t3, then β=t3−t1, so that $\alpha = r_1(t3-t1) = \beta r_1$. Further improvements of β, e.g., synchronizing R1 and r3 to time t4 (so that β=t4−t3) implies that $\alpha = r_1(t4-t1) + r_3(t4-t3) = (r_1+r_3)\beta + r_1(t3-t1)$. Thus, it may be seen that for each synchronization step, a may be represented as a function of β, e.g., α=kβ+b. Then, the Information Value may be expressed as in Eq. (8):

$$IV = IV_{IQE} \times (1-\lambda_{CL})^\alpha (1-\lambda_{SL})^{(1-1/k)\alpha + b/k} \quad \text{Eq. (8)}$$
$$= IV_{IQE} \times ((1-\lambda_{CL})(1-\lambda_{SL})^{1-1/k})^\alpha \times (1-\lambda_{SL})^{b/k}$$

From Eq. (8), it may be observed that if $[(1-\lambda_{CL})(1-\lambda_{SL})^{(1-(1/K))} > 1$, then the Information Value is increasing with the value of α. Otherwise, as α increases, the Information Value decreases.

Figure 17:
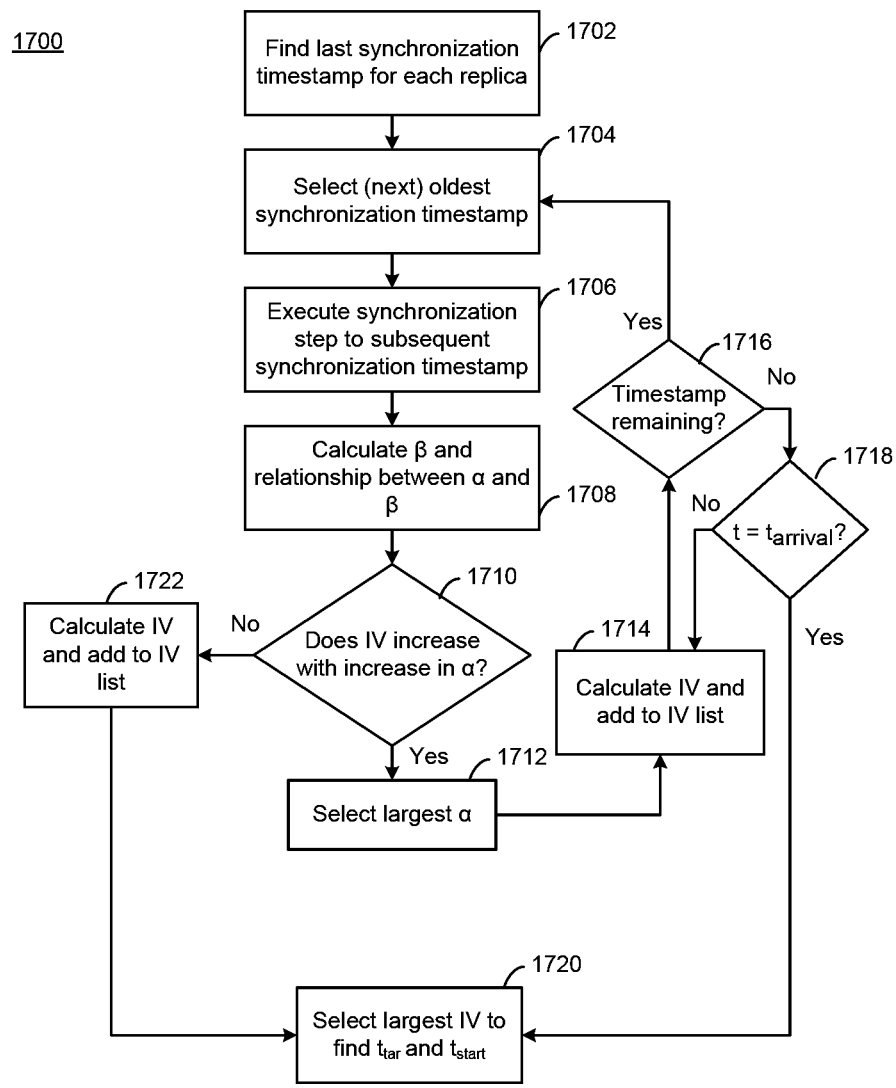
FIG. 17 is a flowchart illustrating operations of the system of FIG. 11 in the context of FIGS. 16A, 16B.

FIG. 17 is a flowchart 1700 illustrating operations of the system of FIG. 11 in the context of FIGS. 16A, 16B. In the example of FIG. 17, and consistent with the explanation just given and with Algorithm 5, below, most-recent synchronization time stamps $t_{last}$ may be determined for each replica database (1702). Then, an oldest synchronization time stamp may be selected (1704), whereupon a synchronization step may be executed to reach the next subsequent $t_{last}$ timestamp (1706).

Then, both β and the relationship between β and α may be determined (1708). For example, the value k in α=kβ+b may be computed. If, for this relationship, Information Value increases with an increase in α (1710), then the largest value for α may be selected (1712) for this synchronization step. Using the thus-calculated values for α and β, an associated Information Value may be calculated and added to a list of Information Values (1714). As long as time stamps $t_{last}$ are remaining (1716), the above-described operations (1704-1714) may be repeated. If no time stamps are remaining (1716) and a time t has not reached $t_{arrival}$ for the query, then testing and updating of the IV list may continue until $t = t_{arrival}$.

If during these operations, an Information Value does not increase with increases in a for an associated synchronization step (1710), then an Information Value may be calculated and added to the IV list at that point. At that time, or, as shown, after t reaches $t_{arrival}$ (1716), the list of Information Values may be considered complete, and the largest Information Value may be selected and used to identify associated values of $t_{tar}$ and $t_{start}$ (1720).

Algorithm 5 provides additional or alternative examples for the operations of the flowchart 1700.

---

Algorithm 5

Input: Replica List R = { $R_0, R_1 \ldots R_{n-1}$ }, Repicas' last sync time TLast[ ], Query's next arrival time $t_{arrival}$;
Output: Sync target $t_{tar}$, sync start time $t_{start}$;
{compute $t_{tar}$ rage}:
1:   for i = 1 to n − 1 do
2:     for j = 0 to i − 1 do
3:       β =TLast[i] − Rj :lasttime;
4:       compute κ for a = kβ + b;
5:       if $(1 − \lambda_{CL})(1 − \lambda_{SL}) 1 − 1/k > 1$ then
6:         compute IV with $t_{tar}$ =TLast[i];
7:         add IV to the possible result list $List_{IV}$
8:       end if
9:     end for
10:   if i reaches n then
11:     continue testing and update $List_{IV}$ until current time t reaches $t_{arrival}$
12:   end if
13:   select the biggest IV from $List_{IV}$ with its $t_{tar}$;
14:   $t_{start}$ is the time stamp of max {$t_{tar}$,TLast[n −1]}
15: end if

---

In Algorithm 2, similarly to FIG. 17, from the replica with the oldest last synchronization time, synchronizations to the fresher time stamps of other replicas of the same query are attempted. When trying each synchronization step, the relationships of α and β are first computed at lines 3-4 of Algorithm 5. If the information value is increased with α (i.e., that later execution with more fresh data will get better information value), the largest α (and associated IV) may be chosen at lines 5-8. Otherwise, the best choice is to calculate IV for the IV list as the best choice in the current synchronization step. After computing all the synchronization steps, the best plan with largest information value may be selected, to thereby determine $t_{tar}$ and $t_{start}$.

The above discussion of FIGS. 16A, 16B and 17 relate to a delay of the query execution start time, with the assumption that an outer bound of the query delay is set by a subsequent arrival time of the same query (e.g., 1620 in FIGS. 16A and 1650 in FIG. 16B). However, this is but one example.

In practice, there may be other limits to an extent to which a given query may be delayed. For example, users may require a response to a query well before a second arrival time of the query. Therefore, in some implementations, users may define a desired query waiting time range.

To reflect these and other potential limitations on query waiting time, a function P(t) (with a value between 0 and 1) limiting the waiting time in the equation for information value (i.e., in Eq. (1)), as shown in Eq. (9):

$$IV = BV \times (1 - \lambda_{CL})^{CL} \times (1 - \lambda_{SL})^{SL} - P(t) \quad \text{Eq. (9)}$$

$$P(t) = \begin{cases} 0 & : t < \delta \\ \mu \alpha^{t-\delta} & : \text{Otherwise} \end{cases}$$

In Eq. (9), $\delta$ is a waiting time threshold, after which the Information Value begins to decrease at a pre-defined rate. The parameters $\mu$ and $\alpha$ are representative parameters which are application-specific and may be set in a desired manner by a user or operator of the DSS 1102. With the inclusion of an appropriate function P(t), the rate of increase of the Information Value as a function of the query delay time will slow and possibly reverse (i.e., begin to decrease). In this way, maximum query wait times will be reduced according to the needs or preferences of the user(s).

FIGS. 18A-18D illustrate example synchronization plans for multi-query workloads. Discussion of multi-query processing is provided above, e.g., with respect to the workload manager 1116 of FIG. 11 (particularly with respect to the genetic algorithm manager 1122), and with respect to FIG. 13.

In the specific example of FIGS. 18A-18D, the example solution generally follows two steps. First, a query workload is divided or clustered into groups of queries which have potentially overlapping query execution plans. Then, within each group, an optimal query execution order may be determined as having the best synchronization plan to generate the largest Information Value. Specifically, for each group, a genetic algorithm (GA) may be used to generate a possible query execution order, and then, for each possible order, a synchronization plan is generated for the included, multiple queries, so as to get the best overall Information Value.

An example multiple synchronization optimization algorithm is illustrated in Algorithm 6, below. In general, given the fact that, the goal is to calculate an overall Information Value among multiple queries, and given that the Information Value of each query is bounded by its associated query value (QV), e.g., business value (BV) in Eq. (1), Algorithm 6, as shown and described below, recognizes that queries with larger business values should generally contribute more in improving the Information Value than queries with relatively small business values. Therefore, Algorithm 6 gives priority to queries with larger business values in determining an ultimate synchronization and/or execution plan for the group.

In practice, however, when computing the best plan of a query $q_i$ of a group of queries, it may be necessary to computer a synchronization/execution plan(s) without knowing or having available similar information for a preceding query. For example, in FIG. 13, if the second query q2 arriving at time 1304 has a very large business value (BV), while the first query q1 arriving previously at time 1302a may have a relatively small BV. Therefore, the second query q2 may be prioritized ahead of the first query q1. In such a case, however, execution and replicas' synchronization plans for the first query q1 are not (at least initially) available (e.g., most-recent time stamps of synchronization).

Therefore, Algorithm 6 and associated/alternative solutions may proceed on an initial assumption that the replicas' last synchronization time stamps are the time stamps of their latest queries' arrival time stamps. For example, an initial assumption may be made that replicas' last synchronization time stamps for the first query q1 in FIG. 13 are equal to the first query first arrival time 1302a. Then, an optimal plan for the prioritized $q_i$ (e.g., the second query q2 in the example) may be calculated according to this assumption.

As a result, there may be time stamp overlaps or gaps caused by the presumably-inaccurate assumption(s) regarding the time stamps of the preceding query (e.g., the first query q1). Consequently, according to the GA order, the time of each query's execution plan and replicas' synchronization plan may be used to compute an Information Value for the corresponding query.

Algorithm 6 is thus presented below as an example of how to execute this methodology, and is described with respect to a specific example illustrated in FIGS. 18A-18D.

---

Algorithm 6

Input: Query set Q = { $q_0, q_1, \ldots, q_n$ } and replica set R = { $R_0, R_1 \ldots R_m$ }.
Output: Query execution plan QP = <time,q> and replica synchronization plan RP = < $t_{start}, t_{tar}, R$ >.
  1: Compute the possible time range of each query;
  2: Group the queries which have overlaps in time range;
  3: for each group of queries do
  4:    for each set of ordered query set Q' generated by GA and termination condition is not met do
  5:      sort Q' by BV, for the queries having the same BV, sort by $(1 - \lambda_{CL}) * (1 - \lambda_{SL})$ in decreasing order into ID; // ID [i] is the query ID ordered at rank i
  6:      for i=0 to n − 1 do
  7:        set Q' [I D [i]]'s replicas' $t_{last}$ to that replica's latest visiting query's $t_{arrival}$;
        8: if ID [i] ≠ 0 and ID [i] ≠ n − 1 and Q' [ID [i] − 1]; Q' [ID [i] + 1] havenot been processed then
          9: compute the time t to sync all the replicas to Q' [ID [i]]'s arrival time;
  10:        set Q' [ID [i]]'s sync start time $t_{start}$ to $t_{arrival} - t$;
    11:      set query Q' [ID [i]]'s execution time $t_q$ to $t_{arrival}$ and ending time to $t_{arrival}$+ computation cost;
  12:    else
  13:      if ID [i] ≠ 0 and ID [i] ≠ n−1 and Q' [ID [i]−1] has not been processed then
        14: set query Q' [ID [i]]'s $t_q$ to Q' [ID [i] + 1]'s $t_{start}$ − Q' [ID [i]]'s computation cost;
  15:      $t_{tar} = t_q$;

Algorithm 6

```
16:             compute Q' [ID [i]]□ 's t_start;
17:             end if
18:        else
19:             if ID [i] ≠ 0 and ID [i] ≠ n −1 and Q' [ID [i]+1]
    has not been processed or ID [i] = n − 1 then
20:                 compute the time t to sync replicas to Q' [ID [i]]'s t_arrival;
21:                 if t+ Q' [ID [i]−1]'s execution complete time> t_arrival then
22:                     choose immediate or delayed plan;
23:                 end if
24:             else
25:                 t_start = t_arrival − t;
26:             end if
27:        else
                28: fit the query and sync plan into the fixed sized time range bounded by
                    Q' [ID [i] −1] and Q' [ID [i]+1], if too short time, just sync without execution
                    and report last result;
29:        end if
30:     end for
31: end for
32: adjust the time stamps;
33: compute IV;
34: end for
```

FIGS. 18A-18D illustrate a query group, cluster or workload 1802 having four queries q1, q2, q3, q4 having a GA order as generated from line 4 of Algorithm 6. In the example, the respective business values for the queries are 3, 2, 4, and 1.

In the example, q1's evaluation involves two replicas R1 and R2, as shown, while q2 involves R2 and R3, q3 involves R1 and R3, and q4 involves R2 and R3. Algorithm 6 follows the business value order which is Q'={q3; q1; q2; q4}, as shown in line 5.

Figure 18A:
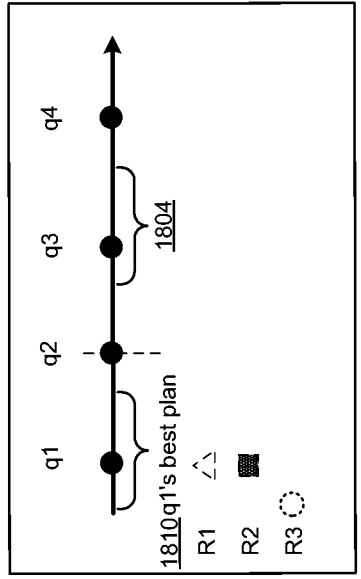
FIGS. 18A-18D illustrate example synchronization plans for multi-query workloads.

Consequently, in FIG. 18A, a synchronization plan 1804 for q3 is processed first, using the assumptions referenced above regarding synchronization timestamps (since actual time stamps are, by definition of the Algorithm, not yet set or defined at this point). As the queries q2 and q4 which are directly before and after q3 have not been processed, an optimal plan for q3 may be selected without regard for any effect on these adjacent queries, and with the just-referenced assumption that R2 has been synchronized to the time stamp of q2's arrival, as set forth in lines 8-11 of Algorithm 6. As shown in FIG. 18A, an example is shown in which the resulting synchronization plan (computed using the techniques above, e.g., FIGS. 15/17 and/or Algorithms 4 and 5), results in synchronizations of R1 to time stamp 1806 and of R3 to time stamp 1808, as shown, with possible adjustments (e.g., delay) of q3.

Figure 18C:
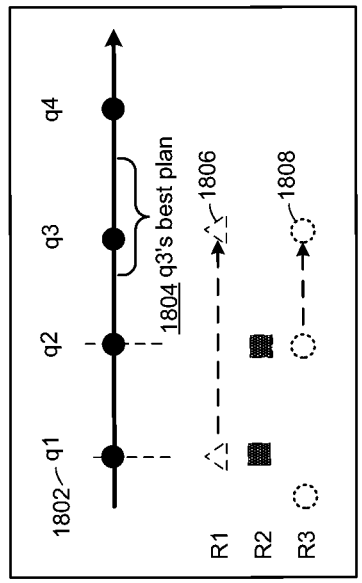
Figure 18B:
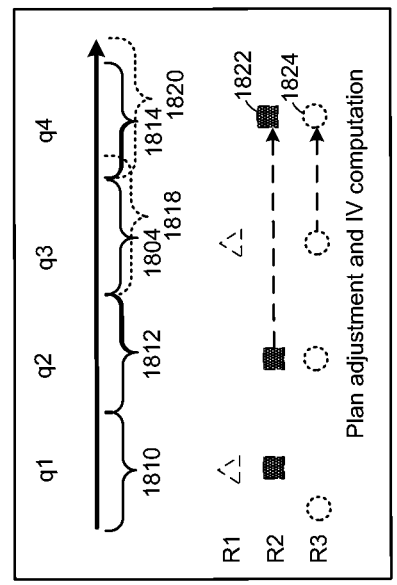

Then, a synchronization plan 1810 for q1 may be processed, as shown in FIG. 18B. As q1 is the first query in the workload, its following query q2 has not been processed, so that an optimized plan can be chosen freely (e.g., updating time stamps for R1 and R2 and/or adjusting an execution time for q1) until q2's arrival.

On the other hand, when processing q2, an associated synchronization plan 1812 is restricted, because both the previous (q1) and following (q3) queries have already been processed. Thus, the possible plan for q2 involves trying to synchronize all involved replicas (i.e., R2, R3) to q2's arrival time as much as possible, even if such synchronization nominally does not provide sufficient execution time (in which case, a previously most-recent query result may be reported).

Then, the results of q2's last execution are returned as shown in FIG. 18C, and in lines 27-28 in Algorithm 6 (represented by the possible gap 18'16 in FIG. 18C). Similarly, a best plan 1814 for q4 may be computed in substantially the same way, as shown in lines 18-27 of Algorithm 6.

Figure 18D:
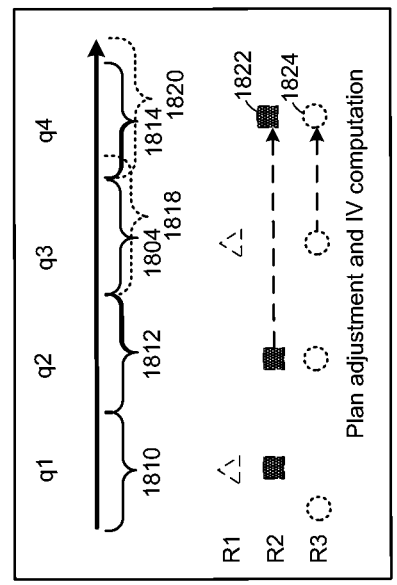

After individual plans 1804, 1810, 1812, and 1814 are generated, the Algorithm starts from q1 and proceeds to q4, and adjusts the time stamps (e.g., to obtain time stamps 1822, 1824 associated with adjusted query plans 1818, 1820 caused by the gap 1816 between the last synchronization assumption and the actual plan generation, as shown in FIG. 18D. Finally, an Information Value may be returned based on the thus-generated, current overall plan.

Figure 19A:
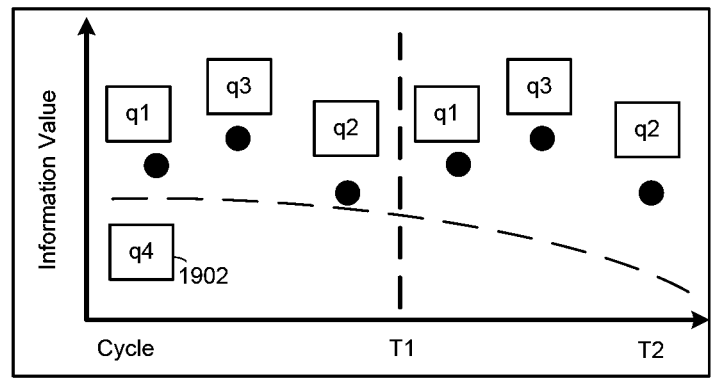
FIGS. 19A, 19B illustrate techniques for avoiding starvation in the multi-query workloads of FIGS. 18A-18D.
Figure 19B:
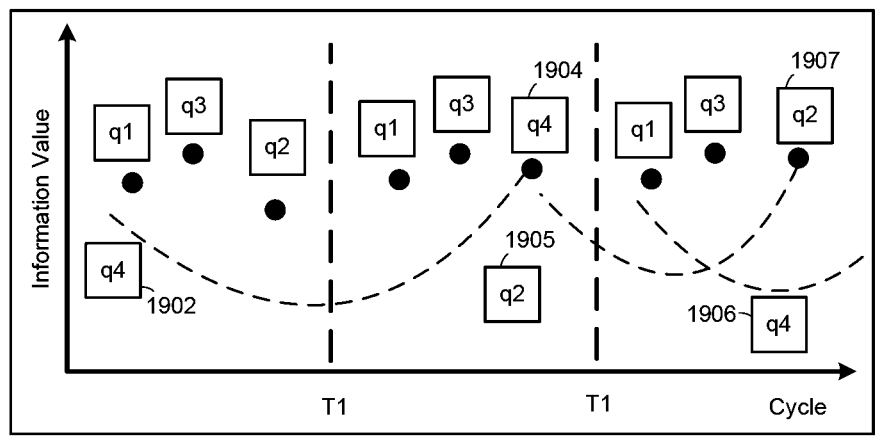

FIGS. 19A, 19B illustrate techniques for avoiding starvation in the multi-query workloads of FIGS. 18A-18D. The issue of starvation in the context of genetic algorithms is discussed above with respect to Algorithm 3. In FIGS. 18A-18D and in Algorithm 6, the information value is calculated according to Eq. (1). As described, the workload manager 1116 selects a workload execution schedule to maximize the information value for the whole workload, instead of individual queries. Eq. (1) favors the queries joining the plan immediately, since the information value decreases as time passes, which may result in starvation for some queries.

In other words, the synchronization scheduler 1118 in the above examples is not explicitly penalized for keeping an already-old/queued query unfulfilled in exchange for processing a recently-received query. In such cases, however, it is possible that such an occurrence leads to a feedback loop for the older query in which its Information Value continually decreases and the query is then constantly queued and never (or rarely) processed. Such starvation may occur, for example, when the system is heavily loaded. Such starvation may not negatively affect the stated goal of achieving the highest-possible Information Value. However, the particular user of the starved query may nonetheless object to the substantial delay or exclusion of the starved query, even if other queries are handled in an otherwise-optimized manner.

To prevent starvation of queries, the Information Value of Eq. (1) may be adapted by adding a function f(t) of waiting time values, so as to increase the business value of the queries queued for a long period, according to Eq. (10):

$$IV = BV \times (t) \times (1-\lambda_{CL})^{CL} \times (1-\lambda_{SL})^{SL} \qquad \text{Eq. (10)}$$

Thus, in FIG. 19A, a query q4 1902 is shown as having a lower BV, and consequently is not included in the query execution plan. Therefore, its information value is decreased as SL increases, and starvation for q4 occurs.

By including the function f(t), as shown in FIG. 19B, After f(t) is involved, q4's business value BV becomes larger as the waiting time increases. In the second cycle, the query q4 1904 is executed and another query q2 1905 is out of the queue. On the other hand, in the next cycle, the query q2 1907 may be elevated, while the query q4 1906 in this cycle is out of queue. In this way, no query is left unprocessed for an unacceptably long amount of time.

Figure 20:
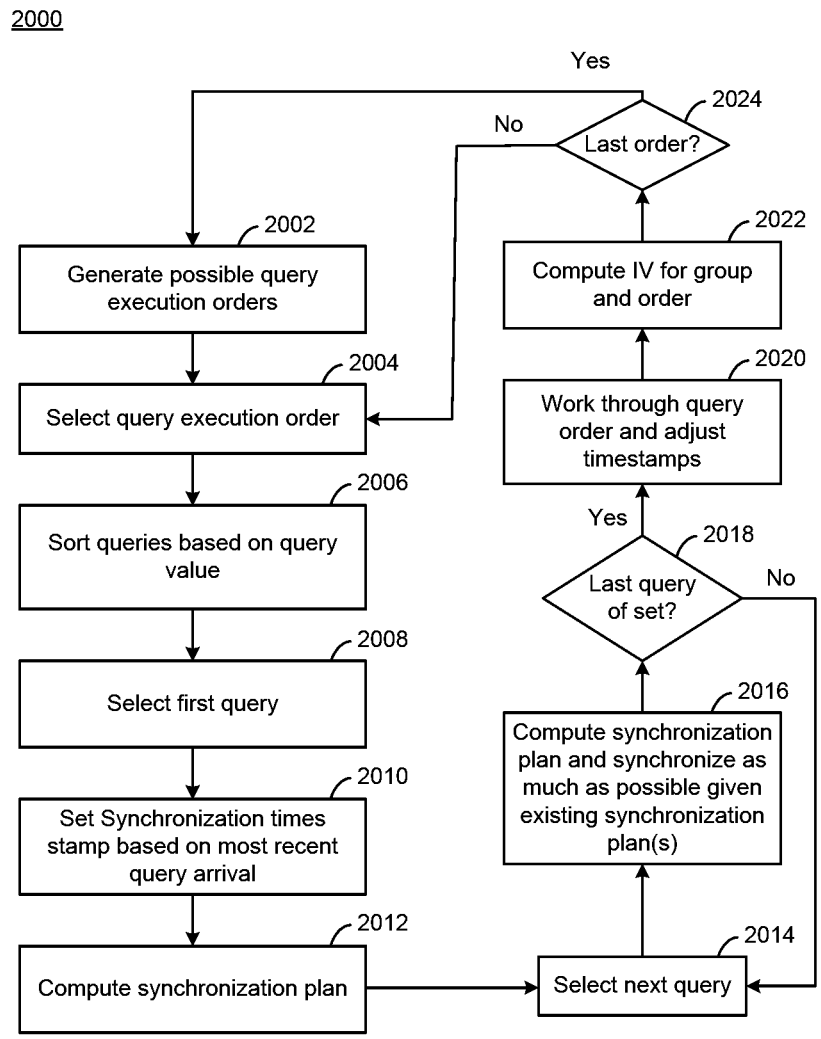
FIG. 20 is a flowchart illustrating operations of the system of FIG. 11 in the context of FIGS. 18A-18D.

FIG. 20 is a flowchart illustrating operations of the system of FIG. 11 in the context of FIGS. 18A-18D, and Algorithm 6. In FIG. 20, possible query execution orders are generated by the genetic algorithm manager 1122 (2002). A query execution order is selected (2004), and the ordered queries are sorted based on their respective business values (2006). A first query is selected according to the sorting (2008), and, for that query, synchronization time stamps are set using an assumption that preceding queries have synchronization time stamps equal to the corresponding query arrival times (2010). A synchronization plan for the first of the ordered queries may then be computed (2012), and a following query from the ordered set may be selected (2014).

For the next selected query, synchronization may occur normally if no existing synchronization plans are in place; otherwise, synchronization occurs as much as possible (2016). This process (2014, 2016) continues (2018) until a last query of the ordered set is reached. Then, time stamps of each query may be adjusted from an earliest to a latest query (2020), so that the overall Information Value for the group and current order may be computed (2022). If this is not the last order (2024), the process may continue with the next order (2004). Otherwise, the genetic algorithm manager 1122 may generate a new possible query execution orders.

It may be appreciated that the above description of the DSS 1102 is but an example, and other implementations are possible. For example, in the above description, only pre-registered queries are considered, generally running periodically in fixed intervals. However, ad hoc queries may be considered, as well.

For example, some online arrival ad hoc queries may arrive for immediate execution, while others arrive for scheduled execution at a later time. Both types may be handled in the following manner.

For example, first, a query plan selection task may be performed, to determine a replica synchronization schedule that optimizes the information value of the query response (e.g., business report) generated by the ad hoc query. If the elapsed time of query processing time and/or synchronization time of more than two queries (existing queries or newly-arrived ad hoc queries) are overlapped, then possible conflicting queries may be identified, and a new workload group for multi-synchronization optimization may be formed.

Then, a workload execution sequence and replica synchronization sequence may be regenerated. For example, if conflicting queries are being processed, one of the following plans for the running queries may be used. For example, the running queries may be canceled and new plans regenerated with the new workload group. Or, the running queries may be allowed to continue to complete as scheduled. In a final example, the running queries may be suspended, and the remaining ones of the query processing steps may be rescheduled with the new workload group (in which case, all suspended queries may use the same query plans and synchronization(s) after they are resumed).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable storage medium and readable by at least one processor, the system comprising:
a query handler configured to cause the at least one processor to receive a query which is applicable against different combinations of a plurality of remote databases and a corresponding plurality of replica databases including at least some replicated data of respective ones of the remote databases, wherein the query arrives at a plurality of query arrival times and is executed at a plurality of query execution times;
a replication manager configured to cause the at least one processor to execute a synchronization plan for at least one selected replica database in which a selected synchronization timestamp of the at least one selected replica database is updated to a target synchronization timestamp, wherein the synchronization occurs during a synchronization processing time; and
a synchronization scheduler configured to cause the at least one processor to:
determine an information value of a query response based on a query value associated with the query, and
schedule the synchronization plan to increase the information value of the query response, including selecting the target synchronization timestamp including relating the synchronization processing time to a selected query execution time.

2. The system of claim 1, wherein the synchronization scheduler is configured to cause the at least one processor to determine the associated information value thereof, based on a query value associated with the query and on a diminishment of the query value caused by a corresponding synchronization plan.

3. The system of claim 1 wherein the synchronization scheduler is configured to cause the at least one processor to select the target synchronization time including finding a range of possible target synchronization times defined by most-recent synchronization time stamps of the at least one selected replica database, and then finding the target synchronization timestamp within the range which permits the synchronization processing time to complete prior to the selected query execution time.

4. The system of claim 1, wherein the synchronization scheduler is configured to cause the at least one processor to schedule the synchronization plan to increase the information value, including determining any adjustment to a computational latency (CL) representing a time between a receipt of the query and an issuance of the query response, and to a synchronization latency (SL) representing a time between the target synchronization timestamp and the query response.

5. The system of claim 4, wherein the synchronization scheduler is configured to cause the at least one processor to schedule the synchronization plan to increase the information value, including determining a query value for the query, and decay rates $\lambda_{CL}$ and $\lambda_{SL}$ for defining an extent of the diminishment associated with each of the computational latency and the synchronization latency, respectively.

6. The system of claim 5 wherein the synchronization scheduler is configured to cause the at least one processor to schedule the synchronization plan to increase the information value, including determining the information value using the formula $IV = QV(1-\lambda_{CL})^{CL}(1-\lambda_{SL})^{SL}$, where IV refers to the information value and QV refers to the query value.

7. The system of claim 1 comprising a query execution scheduler configured to cause the at least one processor to cause an adjustment of the query execution time relative to the target synchronization timestamp and the synchronization processing time.

8. The system of claim 7 wherein the adjustment includes delaying the query execution time.

9. The system of claim 7 wherein the adjustment includes advancing the query execution time.

10. The system of claim 7 wherein the query execution scheduler configured to cause the at least one processor to determine multiple information values associated with multiple potential adjustments of the query execution time, and to select the largest information value from the multiple information values.

11. The system of claim 1 comprising a workload manager configured to cause the at least one processor to schedule the synchronization plan for the at least one query within a group of overlapping queries, and to determine the synchronization plan as part of an optimization of an aggregate information value of the group of queries.

12. The system of claim 11 wherein the workload manager comprises a genetic algorithm manager configured to cause the at least one processor to generate possible query orders for the group of queries, and to sort each of the possible query orders based on a query value associated with each query and used to compute the information value.

13. A computer-implemented method for causing at least one processor to execute instructions recorded on a non-transitory computer-readable storage medium, the method comprising:
receiving a query which is applicable against different combinations of a plurality of remote databases and a corresponding plurality of replica databases including at least some replicated data of respective ones of the remote databases, wherein the query arrives at a plurality of query arrival times and is executed at a plurality of query execution times;
initiating a synchronization plan for at least one selected replica database in which a selected synchronization timestamp of the at least one selected replica database is updated to a target synchronization timestamp, wherein the synchronization occurs during a synchronization processing time;
determining an information value of a query response based on a query value associated with the query; and
scheduling the synchronization plan to increase the information value of the query response, including selecting the target synchronization timestamp including relating the synchronization processing time to a selected query execution time.

14. The method of claim 13, wherein the information value is determined based on a computational latency (CL) including a time between a receipt of a query arrival and the query response, and on a synchronization latency (SL) including a time between a synchronization time stamp and the query response.

15. The method of claim 13 wherein relating the synchronization processing time to a selected query execution time comprises adjusting the query execution time relative to the target synchronization timestamp and the synchronization processing time.

16. The method of claim 13 comprising: including the query within a group of queries; and determining the synchronization plan as part of an optimization of an information value of the group of queries as a whole.

17. A computer program product, the computer program product being tangibly embodied on a non-transitory computer-readable medium and comprising instructions that, when executed, are configured to cause at least one processor to:
  receive a query which is applicable against different combinations of a plurality of remote databases and a corresponding plurality of replica databases including at least some replicated data of respective ones of the remote databases, wherein the query arrives at a plurality of query arrival times and is executed at a plurality of query execution times;
  initiate a synchronization plan for at least one selected replica database in which a selected synchronization timestamp of the at least one selected replica database is updated to a target synchronization timestamp, wherein the synchronization occurs during a synchronization processing time;
  determine an information value of a query response based on a query value associated with the query; and
  schedule the synchronization plan to increase the information value of the query response, including selecting the target synchronization timestamp including relating the synchronization processing time to a selected query execution time.

18. The computer program product of claim 17, wherein the information value is based on a query value associated with the query, and on a diminishment of the query value caused by a corresponding synchronization plan.

19. The computer program product of claim 17 wherein relating the synchronization processing time to a selected query execution time comprises adjusting the query execution time relative to the target synchronization timestamp and the synchronization processing time.

20. The computer program product of claim 17 wherein the instructions, when executed, cause the at least one processor to: include the query within a group of queries; and determine the synchronization plan as part of an optimization of an information value of the group of queries as a whole.

21. The system of claim 1, wherein the synchronization scheduler is further configured to cause the at least one processor to schedule the synchronization plan to complete in advance of a query execution time to thereby increase the information value of the query response, including selecting the target synchronization timestamp for the at least one selected replica database that increases the information value of the query response including relating the synchronization processing time to a selected query execution time including setting the synchronization processing time relative to the selected query execution time to thereby complete the synchronization of the at least one selected replica database in advance thereof while increasing the information value of the query response.

22. The method of claim 13, wherein scheduling the synchronization plan includes scheduling the synchronization plan to complete in advance of a query execution time to thereby increase the information value of the query response, including selecting the target synchronization timestamp for the at least one selected replica database that increases the information value of the query response including relating the synchronization processing time to a selected query execution time including setting the synchronization processing time relative to the selected query execution time to thereby complete the synchronization of the at least one selected replica database in advance thereof while increasing the information value of the query response.

23. The computer program product of claim 17, wherein the instructions, when executed, cause the at least one processor to:
  schedule the synchronization plan to complete in advance of a query execution time to thereby increase the information value of the query response, including selecting the target synchronization timestamp for the at least one selected replica database that increases the information value of the query response including relating the synchronization processing time to a selected query execution time including setting the synchronization processing time relative to the selected query execution time to thereby complete the synchronization of the at least one selected replica database in advance thereof while increasing the information value of the query response.

* * * * *